United States Patent
Ju et al.

(10) Patent No.: US 10,606,389 B2
(45) Date of Patent: Mar. 31, 2020

(54) TOUCH DISPLAY DEVICE, PEN, TOUCH SYSTEM, TOUCH CIRCUIT, AND PEN RECOGNITION METHOD

(71) Applicant: LG DISPLAY CO., LTD., Seoul (KR)

(72) Inventors: Suyun Ju, Gangwon-do (KR); HyungUk Jang, Paju-si (KR); SangHyuck Bae, Paju-si (KR); DoYoung Jung, Seoul (KR); SeungSeok Oh, Seoul (KR); Sungsu Han, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 70 days.

(21) Appl. No.: 15/791,665

(22) Filed: Oct. 24, 2017

(65) Prior Publication Data
US 2019/0004649 A1    Jan. 3, 2019

(30) Foreign Application Priority Data
Jun. 30, 2017    (KR) .................... 10-2017-0083673

(51) Int. Cl.
*G06F 3/041*    (2006.01)
*G06F 3/0354*    (2013.01)
*G06F 3/044*    (2006.01)

(52) U.S. Cl.
CPC ........ *G06F 3/0412* (2013.01); *G06F 3/03545* (2013.01); *G06F 3/041* (2013.01); *G06F 3/044* (2013.01); *G06F 2203/04106* (2013.01)

(58) Field of Classification Search
CPC .... G06F 3/03545; G06F 3/041; G06F 3/0412; G06F 3/044
See application file for complete search history.

(56) References Cited

U.S. PATENT DOCUMENTS

| 9,639,183 B2* | 5/2017 | Fleck | .................. G06F 3/03545 |
| 2012/0062498 A1* | 3/2012 | Weaver | ............... G06F 3/03545 |
| | | | 345/174 |
| 2014/0028607 A1 | 1/2014 | Tan et al. | |

(Continued)

FOREIGN PATENT DOCUMENTS

JP    2016-099687 A    5/2016

OTHER PUBLICATIONS

Extended European Search Report dated, dated May 14, 2018 in corresponding European Patent Application No. 17201265.0.

(Continued)

*Primary Examiner* — Xuemei Zheng
(74) *Attorney, Agent, or Firm* — Morgan, Lewis & Bockius LLP

(57) ABSTRACT

A touch display device may include: a panel including a plurality of touch electrodes, and a touch circuit configured to: transfer a panel driving signal to the panel, and receive a pen information signal, output from a pen in response to the panel driving signal, through the panel, each of the panel driving signal and the pen information signal including a plurality of pulses, the pen information signal including one or more state sections among: an in-phase state section including pulses in phase with the pulses of the panel driving signal, an antiphase state section including pulses having a different phase from the pulses of the panel driving signal, and a passive state section distinguished from the in-phase state section and the antiphase state section.

24 Claims, 33 Drawing Sheets

(56) References Cited

U.S. PATENT DOCUMENTS

| | | |
|---|---|---|
| 2016/0139730 A1 | 5/2016 | Kida et al. |
| 2016/0306444 A1 | 10/2016 | Fleck |
| 2017/0060278 A1 | 3/2017 | Jung et al. |
| 2017/0153763 A1* | 6/2017 | Vavra .................... G06F 3/0488 |

OTHER PUBLICATIONS

Office Action dated Jan. 29, 2019, from the Japanese Patent Office in corresponding Japanese Patent Application No. 2017-213507.

* cited by examiner

FIG.8

Pen Searching Mode

| LHB #1 | LHB #2 | LHB #3 | LHB #4 | LHB #5 | LHB #6 | LHB #7 | LHB #8 | LHB #9 | LHB #10 | LHB #11 | LHB #12 | LHB #13 | LHB #14 | LHB #15 | LHB #16 |
|---|---|---|---|---|---|---|---|---|---|---|---|---|---|---|---|
| BCON | F/S | F/S | F/S | F/S | F/S | F/S | F/S | BCON | F/S | F/S | F/S | F/S | F/S | F/S | F/S |

FIG. 9

Pen Mode

| LHB #1 | LHB #2 | LHB #3 | LHB #4 | LHB #5 | LHB #6 | LHB #7 | LHB #8 | LHB #9 | LHB #10 | LHB #11 | LHB #12 | LHB #13 | LHB #14 | LHB #15 | LHB #16 |
|---|---|---|---|---|---|---|---|---|---|---|---|---|---|---|---|
| BCON | PLOC | DATA | FLOC | PLOC | DATA | DATA | FLOC | PLOC | DATA | DATA | FLOC | PLOC | DATA | DATA | FLOC |

FIG.15

| | 2-State (sym=0,1) | |
|---|---|---|
| Case | Two-digit Symbol String | Three-digit Symbol String |
| 1 | 00 | 000 |
| 2 | 01 | 001 |
| 3 | 10 | 010 |
| 4 | 11 | 011 |
| 5 | | 100 |
| 6 | | 101 |
| 7 | | 110 |
| 8 | | 111 |

FIG.18

| | 3-State (sym=0,1,-) | |
|---|---|---|
| Case | Two-digit Symbol String | Three-digit Symbol String |
| 1 | 00 | 000 |
| 2 | 01 | 001 |
| 3 | 0- | 00- |
| 4 | 10 | 010 |
| 5 | 11 | 011 |
| 6 | 1- | 01- |
| 7 | -0 | 0-0 |
| 8 | -1 | 0-1 |
| 9 | -- | 0-- |
| 10 | | 100 |
| 11 | | 101 |
| 12 | | 10- |

| ⋮ | ⋮ | ⋮ |

| 25 | | --0 |
| 26 | | --1 |
| 27 | | --- |

FIG.23

|  | Duty Ratio (DR) | sym | State |
|---|---|---|---|
| In-phase State | DR_P_1 | 0 | State 1 |
|  | DR_P_2 | 1 | State 2 |
|  | ... | ... | ... |
|  | DR_P_A | A−1 | State A |
| Antiphase State | DR_R_1 | A | State A+1 |
|  | DR_R_2 | A+1 | State A+2 |
|  | ... | ... | ... |
|  | DR_R_B | A+B−1 | State A+B |
| Passive State |  | A+B | State A+B+1 |

FIG.26

|  | Amplitude (AMP) | sym | State |
|---|---|---|---|
| In-phase State | AMP_P_1 | 0 | State 1 |
|  | AMP_P_2 | 1 | State 2 |
|  | ... | ... | ... |
|  | AMP_P_C | C-1 | State C |
| Antiphase State | AMP_P_1 | C | State C+1 |
|  | AMP_P_2 | C+1 | State C+2 |
|  | ... | ... | ... |
|  | AMP_P_D | C+D-1 | State C+D |
| Passive State |  | C+D | State C+D+1 |

TOUCH DISPLAY DEVICE, PEN, TOUCH SYSTEM, TOUCH CIRCUIT, AND PEN RECOGNITION METHOD

CROSS-REFERENCE TO RELATED APPLICATIONS

This application claims the priority of Korean Application No. 10-2017-0083673, filed on Jun. 30, 2017, the entirety of which is hereby incorporated by reference.

BACKGROUND

Technical Field

The present disclosure relates to a touch display device, a pen, a touch system, a touch circuit, and a pen recognition method.

Discussion of the Related Art

In response to the development of the information society, there has been increasing demand for display devices able to display images. Recently, a range of display devices, such as liquid crystal display (LCD) devices, plasma display panels (PDPs), and organic light-emitting display devices, have come into widespread use.

Many display devices provide touch-based user interfaces enabling users to intuitively and conveniently input data or instructions directly to devices, rather than using conventional data input systems, such as buttons, a keyboard, or a mouse. To provide such touch-based user interfaces, the ability to sense a user's touch and accurately detect touch coordinates is required.

In addition, in response to demand for accurate touch input systems using a pen (or a pointer), rather than a finger or the like, the development of pen touch technology has been undertaken. However, it is significantly difficult for display devices to efficiently provide both a finger touch function and a pen touch function while still providing a display function.

In addition, display devices must be able to accurately and rapidly recognize information regarding pens to provide pen-associated functions. Recently, trends toward extended and more complex pen-associated functions inevitably increase the amount of pen information transmitted from pens to display devices.

However, considering the characteristics of pen output signals, a significantly long time must be taken to transmit a large amount of and various types of pen information, or a large amount of and various types of pen information may not be transmitted within a limited time, which is problematic. Consequently, pen information may not be recognized or may be slowly recognized, so an ordinary pen touch function or an ordinary pen-associated function may not be provided.

SUMMARY

Accordingly, the present disclosure is directed to a touch display device, a pen, a touch system, a touch circuit, and a pen recognition method that substantially obviate one or more of the issues due to limitations and disadvantages of the related art.

In one aspect, embodiments of the present disclosure may provide a touch display device, an active pen, a touch system, a touch circuit, and a pen recognition method that allow a variety of and a greater amount of pen information to be rapidly transmitted within a limited time.

In another aspect, embodiments of the present disclosure may provide a touch display device, an active pen, a touch system, a touch circuit, and a pen recognition method that allow a variety of and a greater amount of pen information to be accurately expressed in a shorter length.

In another aspect, embodiments of the present disclosure may provide a touch display device, an active pen, a touch system, a touch circuit, and a pen recognition method that can further increase the amount of pen information that a pen information signal can carry within a predetermined limited time, so a greater amount of pen information regarding the active pen can be more rapidly and accurately recognized.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a touch display device, including: a panel including a plurality of touch electrodes, and a touch circuit configured to: transfer a panel driving signal to the panel, and receive a pen information signal, output from a pen in response to the panel driving signal, through the panel, each of the panel driving signal and the pen information signal including a plurality of pulses, the pen information signal including one or more state sections among: an in-phase state section including pulses in phase with the pulses of the panel driving signal, an antiphase state section including pulses having a different phase from the pulses of the panel driving signal, and a passive state section distinguished from the in-phase state section and the antiphase state section.

In another aspect, there is provided a touch system, including: a pen configured to contact or be adjacent to a panel, and a touch circuit configured to: transfer a panel driving signal to the panel, and receive a pen information signal, output from the pen in response to the panel driving signal, through the panel, each of the panel driving signal and the pen information signal including a plurality of pulses, the pen information signal including one or more state sections among: an in-phase state section including pulses in phase with the pulses of the panel driving signal, an antiphase state section including pulses having a different phase from the pulses of the panel driving signal, and a passive state section distinguished from the in-phase state section and the antiphase state section.

In another aspect, there is provided a pen recognition method, including: transferring a panel driving signal to the panel, receiving a pen information signal, output from a pen in contact with or adjacent to the panel in response to the panel driving signal, through the panel, each of the panel driving signal and the pen information signal including a plurality of pulses, the pen information signal including one or more state sections among: an in-phase state section including pulses in phase with the pulses of the panel driving signal, an antiphase state section including pulses having a different phase from the pulses of the panel driving signal, and a passive state section distinguished from the in-phase state section and the antiphase state section, and recognizing pen information regarding the pen based on the pen information signal.

In another aspect, there is provided a pen working in concert with a touch display device, including: at least one pen tip configured to be brought into contact with or brought adjacently to a panel of a touch display device, and a processor configured to: receive a panel driving signal through the at least one pen tip, and output a pen information signal through the at least one pen tip in response to the panel driving signal, each of the panel driving signal and the pen information signal including a plurality of pulses, the pen information signal including one or more state sections among an in-phase state section including pulses in phase with the pulses of the panel driving signal, an antiphase state section including pulses having a different phase from the pulses of the panel driving signal, and a passive state section distinguished from the in-phase state section and the antiphase state section.

In another aspect, there is provided a touch circuit, including: a first circuit configured to: output a panel driving signal to a panel, receiving a pen information signal, output from a pen in response to the panel driving signal, through the panel, each of the panel driving signal and the pen information signal including a plurality of pulses, the pen information signal including one or more state sections among: an in-phase state section including pulses in phase with the pulses of the panel driving signal, an antiphase state section including pulses having a different phase from the pulses of the panel driving signal, and a passive state section distinguished from the in-phase state section and the antiphase state section, and output a digital value corresponding to the pen information signal.

In another aspect, there is provided a touch display device, including: a panel including a plurality of touch electrodes, and a touch circuit configured to: transfer a panel driving signal to the panel, and receive a pen information signal, output from a pen in response to the panel driving signal, through the panel, each of the panel driving signal and the pen information signal including a plurality of pulses, the pen information signal including a pulse section, in which at least one of a phase, a duty ratio, and an amplitude is varied.

In another aspect, there is provided a pen working in concert with a touch display device, including: at least one pen tip configured to contact or be adjacent to a panel of a touch display device, and a processor configured to: receive a panel driving signal through the at least one pen tip, and output a pen information signal through the at least one pen tip in response to the panel driving signal, each of the panel driving signal and the pen information signal including a plurality of pulses, the pen information signal including a pulse section, in which at least one of a phase, a duty ratio, and an amplitude is varied.

In another aspect, there is provided a touch circuit, including: a first circuit configured to: output a panel driving signal to a panel, receive a pen signal, output from a pen in response to the panel driving signal, through the panel, the pen signal including a pulse section, in which at least one of a phase, a duty ratio, and an amplitude is varied, each of the panel driving signal and the pen signal including a plurality of pulses, and output a digital value corresponding to the pen signal, and a second circuit configured to receive the digital value.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain various principles of the disclosure.

FIG. 8 illustrates a pen searching mode of a touch system according to an example embodiment.

FIG. 9 illustrates a pen mode of the touch system according to an example embodiment.

FIG. 15 illustrates pen information expressed by a two-digit symbol string and a three-digit symbol string using the two states and the two symbol values in the touch system according to an example embodiment.

FIG. 18 illustrates pen information expressed by a two-digit symbol string and a three-digit symbol string using the three states and the three symbol values in the touch system according to an example embodiment.

FIG. 23 illustrates (A+B+1) number of states and (A+B+1) number of symbol values generated by duty ratio variable control to further increase the amount of pen information that the pen information signal can carry within a predetermined limited time in the touch system according to an example embodiment.

FIG. 26 illustrates (C+D+1) number of states and (C+D+1) number of symbol values generated by amplitude variable control to further increase the amount of pen information that the pen information signal can carry within a predetermined limited time in the touch system according to an example embodiment.

Figure 1:
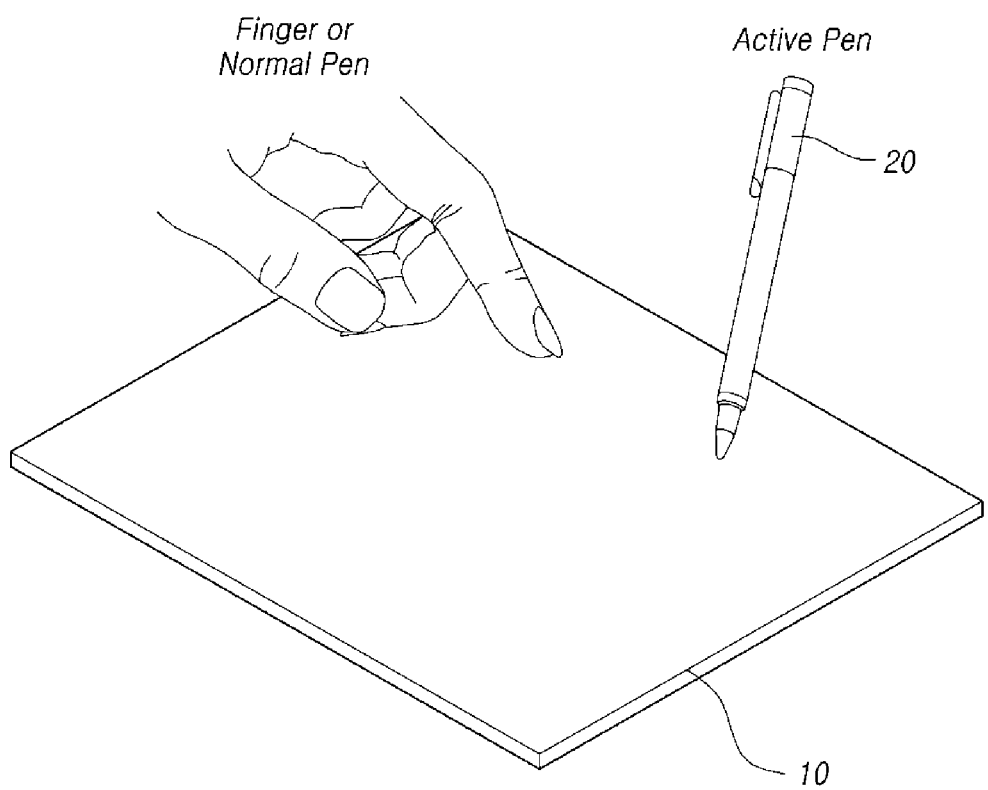
FIG. 1 is a perspective view illustrating a touch system according to an example embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to some embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

FIG. 1 may be a perspective view illustrating a touch system according to an example embodiment.

The touch system according to an example embodiment may include a touch display device 10 and an active pen 20 working in concert with the touch display device 10. The touch display device 10 may be an electronic device that, not only can provide an image display function, but can also provide a first touch sensing function to sense a touch performed using a finger, a normal pen, or the like, and a second touch sensing function (or a pen recognition function) to sense at least one active pen 20.

In the present disclosure, the active pen 20 may be a pen having a signal transceiving function, may be able to work in concert with the touch display device 10, and may include a power supply thereof. The active pen 20 may also be referred to as a stylus, a pointer, a pointer pen, an active pointer pen, or the like. The "normal" pen may mean a pen or the like that does not have a signal transceiving function, does not work in concert with the touch display device 10, or does not have a power supply thereof. Throughout the present disclosure, for the sake of brevity, the active pen 20 may simply be referred to as a "pen."

The active pen 20 may be an active touch input device having a function of transmitting and receiving signals to and from the touch display device 10, while a finger or a normal pen may be a normal touch input means without the function of transmitting and receiving signals to and from the touch display device 10. Hereinafter, for the sake of brevity, the "normal" touch input means will be collectively referred to as a "finger." However, the term "finger" that will be described hereinafter should be interpreted as including all types of normal touch input means, such as a normal touch pen.

The touch display device 10 according to an example embodiment may be, for example, a television (TV), a monitor, or a mobile device, such as a tablet computer or a smartphone. The touch display device 10 according to an example embodiment may include a display part enabling an image display function and a touch sensing part enabling a touch sensing function.

Hereinafter, the structures of the display part and the touch sensing part of the touch display device 10 will be briefly described with reference to FIGS. 2 to 5.

Figure 2:
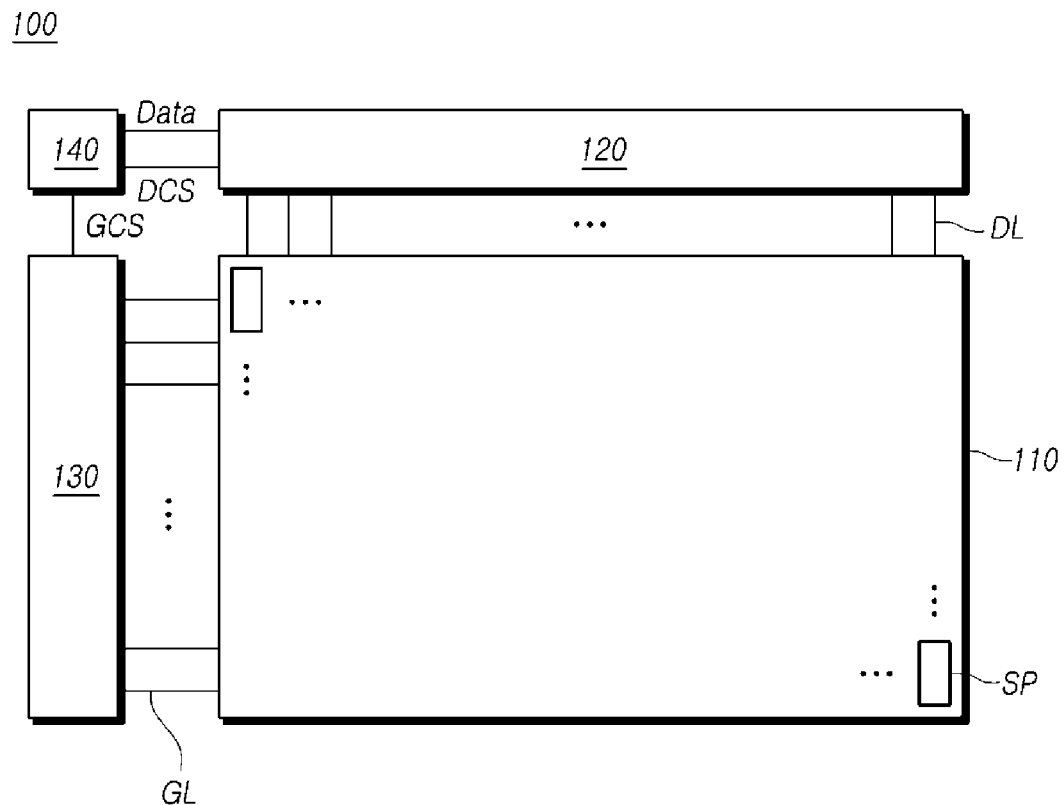
FIG. 2 illustrates a display part in the touch display device according to an example embodiment.
Figure 3:
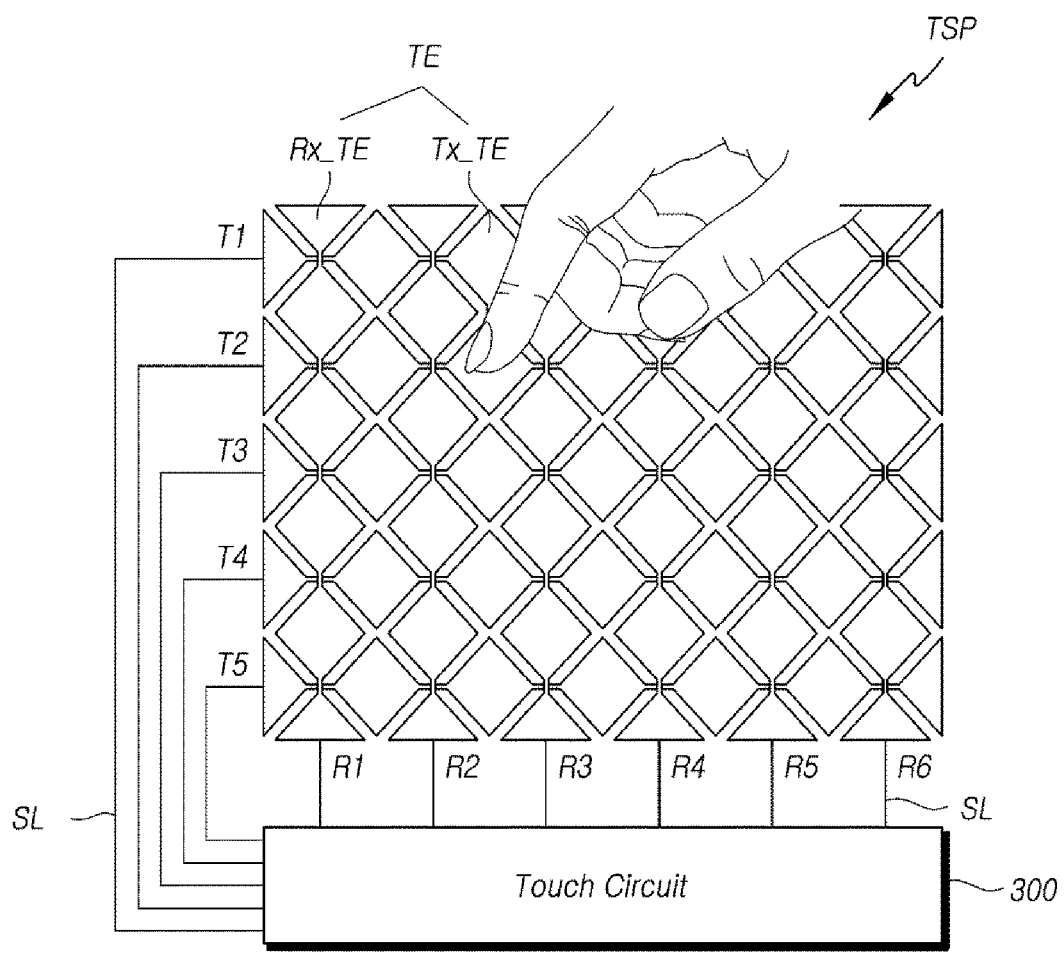
FIG. 3 illustrates a touch sensing part for mutual-capacitance-based touch sensing in the touch display device according to an example embodiment.
Figure 4:
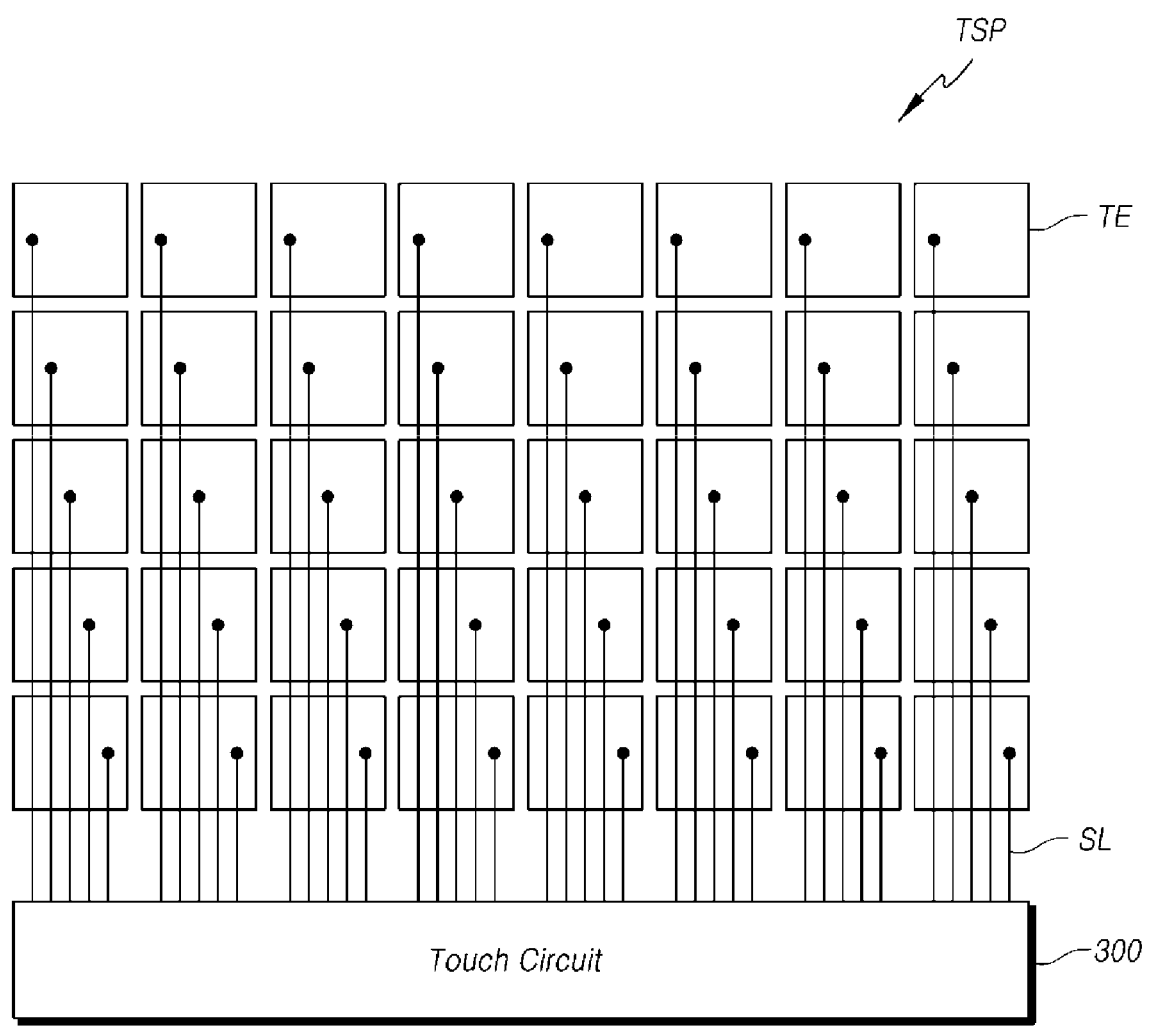
FIG. 4 illustrates a touch sensing part for self-capacitance-based touch sensing in the touch display device according to an example embodiment.
Figure 5:
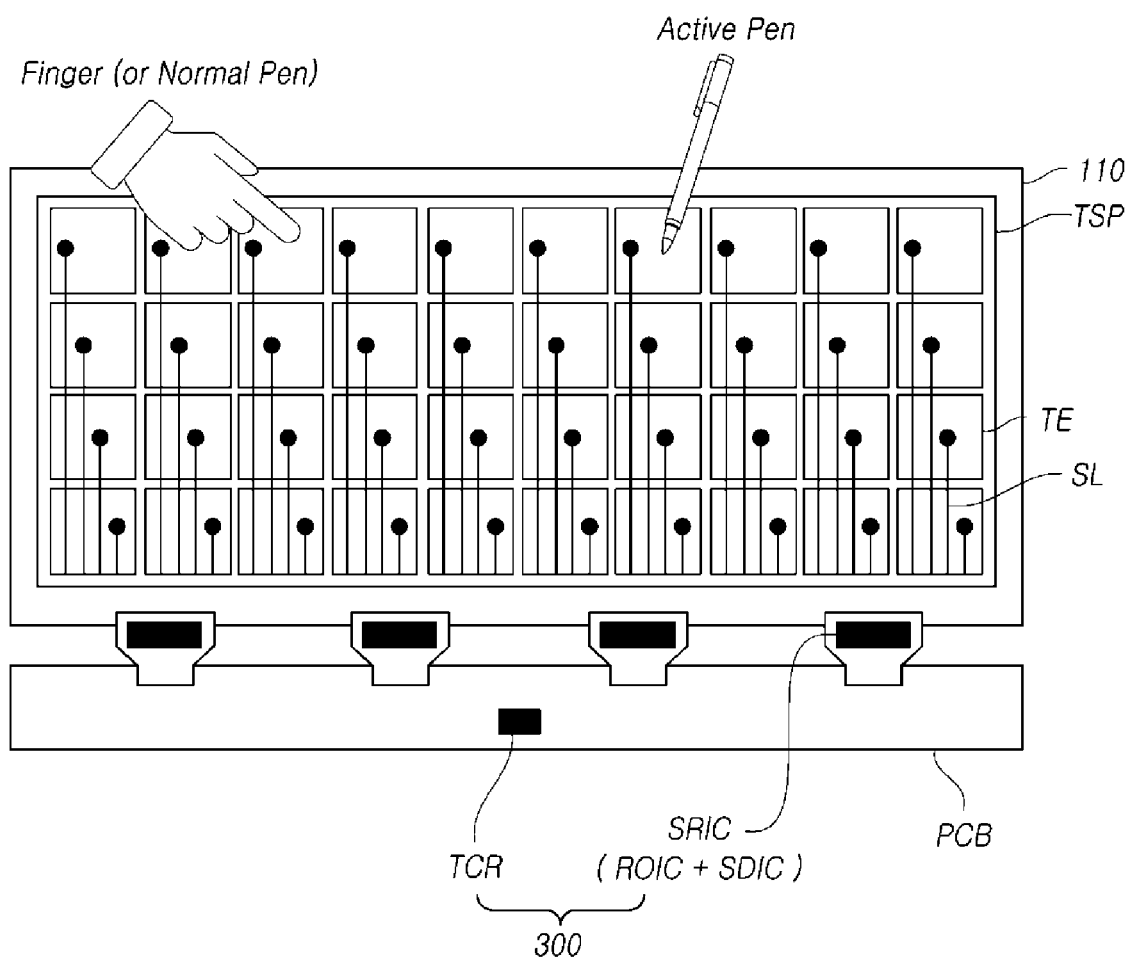
FIG. 5 illustrates an application of the touch display device according to an example embodiment.

FIG. 2 illustrates a display part in the touch display device 10 according to an example embodiment. FIGS. 3 and 4 illustrate two types of touch sensing parts in the touch display device 10 according to an example embodiment. FIG. 5 illustrates an application of the touch display device 10 according to an example embodiment.

With reference to FIG. 2, the display part of the touch display device 10 according to an example embodiment may include a display panel 110, a data driver circuit 120, a gate driver circuit 130, and a controller 140. In the display panel 110, a plurality of data lines DL and a plurality of gate lines GL may be arranged, which may define an array of a plurality of subpixels SP.

The data driver circuit 120 may drive the plurality of data lines DL by supplying data voltages to the plurality of data lines DL. The gate driver circuit 130 may drive the plurality of gate lines GL by sequentially transferring scanning signals to the plurality of gate lines GL. The controller 140 may control the operations of the data driver circuit 120 and the gate driver circuit 130 by transferring a variety of control signals such as data control signal DCS and gate control signal GCS to the data driver circuit 120 and the gate driver circuit 130.

The controller 140 may start scanning at points in time defined in frames, may convert input image data input from an external source into a data signal format readable by the data driver circuit 120 before outputting the converted image data, and may regulate data processing at suitable points in time in response to scanning. The controller 140 may be a timing controller used in typical fields of display technology, or may be a control device performing other control functions, including the function as the timing controller. The controller 140 may be embodied as a component separate from the data driver circuit 120, or may be embodied as an integrated circuit (IC) together with the data driver circuit 120.

The data driver circuit 120 may include one or more source driver integrated circuits (SDICs). Each of the SDICs may include, for example, a shift register, a latch circuit, a digital-to-analog converter (DAC), an output buffer, and the like. In some cases, each of the SDICs may further include an analog-to-digital converter (ADC).

The gate driver circuit 130 may include one or more gate driver integrated circuits (GDICs). Each of the GDICs may include, for example, a shift register, a level shifter, and the like.

The data driver circuit 120 may be located on one side of (e.g., above or below) the display panel 110, or in some cases, may located on both sides of (e.g., above and below) the display panel 110, depending on the driving system, the design of the panel, or the like. The gate driver circuit 130 may be located on one side (e.g., to the right or left) of the display panel 110, or in some cases, may be located on both sides (e.g., to the right and left) of the display panel 110, depending on the driving system, the design of the panel, or the like. The display panel 110 may be a display panel selected from among a variety of display panels, including a liquid crystal display (LCD) panel, an organic light-emitting display panel, a plasma display panel, and the like.

The touch display device 10 can sense a touch input performed by the finger and/or a touch input performed by the active pen 20, using a capacitance-based touch sensing method. In this regard, as illustrated in FIGS. 3 and 4, the touch display device 10 may include a touchscreen panel TSP having an array of a plurality of touch electrodes TE and a touch circuit 300 driving the touchscreen panel TSP.

The touch display device 10 can provide a mutual-capacitance-based touch sensing function to sense a touch input by measuring an amount of capacitance formed between two types of touch electrodes Tx_TE and Rx_TE among the plurality of touch electrodes TE or a variation of the capacitance, or can provide a self-capacitance-based touch sensing function to sense a touch input by measuring an amount of capacitance formed on every single touch electrode TE among the plurality of touch electrodes TE.

With reference to FIG. 3, in the touchscreen panel TSP, first touch electrode lines (or touch driving lines) T1 to T5, through which a touch driving signal may be transferred, may be arranged across second touch electrode lines (or touch sensing lines) R1 to R6, through which touch sensing signals may be transferred, for the mutual-capacitance-based touch sensing.

Each of the first touch electrode lines T1 to T5 may be a bar-shaped electrode extending in a row direction. Each of the second touch electrode lines R1 to R6 may be a bar-shaped electrode extending in a column direction.

Alternatively, as illustrated in FIG. 3, each of the first touch electrode lines T1 to T5 may be a line of first touch electrodes among the plurality of first touch electrodes (or touch driving electrodes) Tx_TE, where the first touch electrodes in the same line may be electrically connected. Also, each of the second touch electrode lines R1 to R6 may be a line of second touch electrodes among the plurality of second touch electrodes (or touch sensing electrodes) Rx_TE, where the second touch electrodes in the same line may be electrically connected.

Each of the first touch electrode lines T1 to T5 may be electrically connected to the touch circuit 300 through one or more signal lines SL. Each of the second touch electrode lines R1 to R6 may be electrically connected to the touch circuit 300 through one or more signal lines SL.

With reference to FIG. 4, for the self-capacitance-based touch sensing, the touchscreen panel TSP may have an arrangement of the plurality of touch electrodes TE. Each of the plurality of touch electrodes TE can receive a touch driving signal, and a touch sensing signal can be detected therefrom. Each of the plurality of touch electrodes TE may be electrically connected to the touch circuit 300 through one or more signal lines SL.

Hereinafter, an example in which the touch display device 10 provides a self-capacitance-based touch sensing method and the touchscreen panel TSP for the self-capacitance-based touch sensing method may be designed as illustrated in FIG. 4 will be described for the sake of brevity. The shape of the touch electrodes TE illustrated in FIGS. 3 and 4 may be illustrative only, and the touch electrodes TE may be designed to have a variety of other shapes.

The size of an area in which a single touch electrode TE may be located may correspond to or be greater than the size of an area in which a single subpixel may be defined. For example, the size of the area of a single touch electrode TE may correspond to the total size of the areas of several to tens of subpixels.

The touchscreen panel TSP may be an add-on touchscreen panel that may be fabricated separately to the display panel 110 before being attached to the display panel 110, or may be an internal touchscreen panel (e.g., an in-cell touchscreen panel or an on-cell touchscreen panel) that may be disposed within the display panel 110.

With reference to FIG. 5, the touch circuit 300 may include one or more first circuits ROIC and a second circuit TCR. The one or more first circuits ROIC may transfer a touch driving signal to the touchscreen panel TSP, and may detect (or receive) touch sensing signals from the touchscreen panel TSP. The second circuit TCR may determine a touch input and/or a touched position, based on the result of the detection of the touch sensing signal by the one or more first circuits ROIC, and the like.

The one or more first circuits ROIC of the touch circuit 300 may be implemented as individual components or as a single component. The one or more first circuits ROIC of the touch circuit 300 and the one or more SDICs of the data driver circuit 120 may be embodied as one or more combined ICs SRICs. That is, the touch display device 10 may include one or more combined ICs SRIC. Each of the combined ICs may include a first circuit ROIC and an SDIC.

In an example in which the touchscreen panel TSP is an internal touchscreen panel disposed within the display panel 110 and the signal lines SL connected to the touch electrodes TE are arranged in parallel to the data lines DL, the combined configuration of the first circuit ROIC designed for the touch driving and the SDIC for the data driving can more efficiently perform the touch driving and the data driving.

When the touchscreen panel TSP is an internal touchscreen panel disposed within the display panel 110, the touch electrodes TE may be blocks of common electrodes. During a touch sensing period, a touch driving signal may be applied to the touch electrodes TE, or touch sensing signals may be detected from the touch electrodes TE. During an image displaying period, a common voltage may be applied to the touch electrodes TE. During the image display period, the touch electrodes TE can be electrically connected within the touch circuit 300, and can have a common voltage commonly applied thereto.

During the touch sensing period, one or more touch electrodes of the touch electrodes TE within the touch circuit 300 may be selected, such that the one or more first circuits ROIC of the touch circuit 300 can apply a touch driving signal to the selected one or more touch electrodes TE or detect touch sensing signals from the selected one or more touch electrodes TE.

During the touch sensing period, when a panel driving signal, as a touch driving signal for sensing a touch input performed by the finger and/or a touch input performed by the active pen 20 or recognizing pen information regarding the active pen 20, is transferred to the touch electrodes TE and the signal lines SL, signals the same as, or corresponding to, the panel driving signal may be applicable to other electrodes and signal lines adjacent to the touch electrodes TE and the signal lines SL.

In an example, during the touch sensing period, a panel driving signal or a corresponding signal may be transferred to all or portions of the data lines. In another example, during the touch sensing period, a panel driving signal or a corresponding signal may be transferred to all or portions of the gate lines. In yet another example, during the touch sensing period, a panel driving signal or a corresponding signal may be transferred to all of, or portions of, the touch electrodes TE. According to an example embodiment, a panel driving signal may be any signal applied to the touchscreen panel TSP, the display panel 110, or the display panel 110 having the touchscreen panel TSP as an internal component.

Regarding realization and positions of ICs in the touch display device 10, for example, the combined ICs SRIC may be mounted on a film that has one edge connected to the touchscreen panel TSP and the other edge connected to a printed circuit board PCB. As described above, the combined ICs SRIC, according to a chip-on-film (COF) method, can be electrically connected to the touchscreen panel TSP and the second circuit TCR mounted on the PCB through lines in the film. The combined ICs SRIC may be implemented as chip-on-glass (COG) ICs that may be disposed on the touchscreen panel TSP. The one or more first circuits ROIC of the touch circuit 300 and the second circuit TCR may be integrated as a single component.

Figure 6:
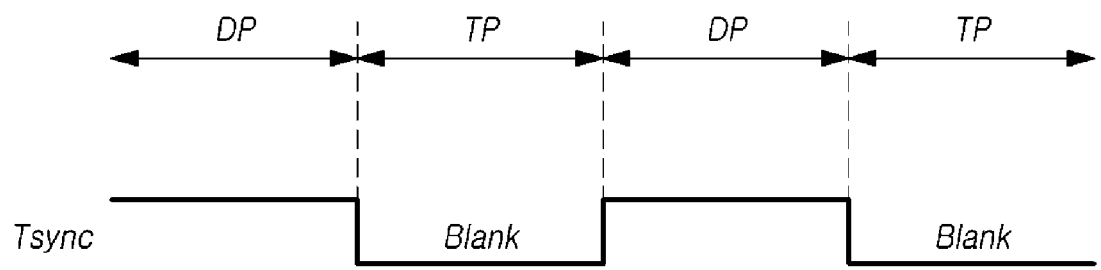
FIG. 6 illustrates the timing of display and touch periods in the touch display device according to an example embodiment.
Figure 7:
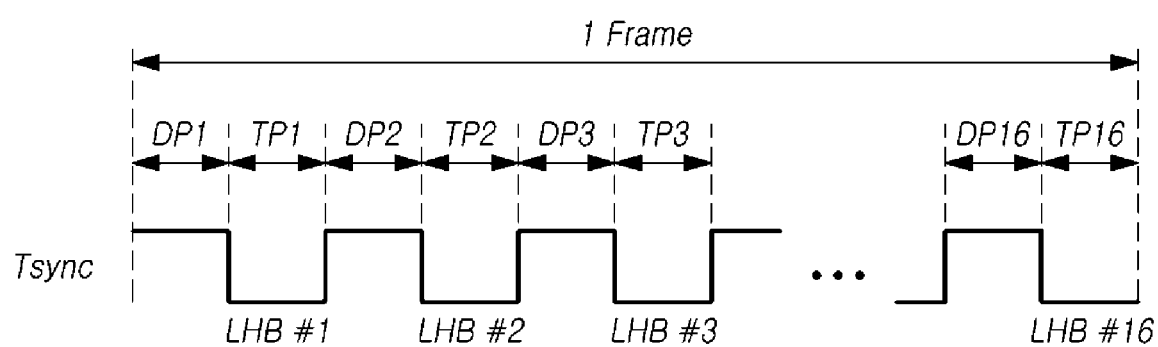
FIG. 7 illustrates display periods and touch periods produced by dividing the time of a single frame based on time in the touch display device according to an example embodiment.

FIG. 6 illustrates the timing of display and touch periods in the touch display device according to an example embodiment. FIG. 7 illustrates display periods and touch periods produced by dividing the time of a single frame based on time in the touch display device according to an example embodiment.

With reference to FIG. 6, the touch display device 10 according to an example embodiment may perform display driving to display images during a predetermined display period DP, and may perform touch driving to sense a touch input performed by the finger and/or a touch input performed by the active pen 20 during a predetermined touch period TP. The display period DP and the touch period TP may be the same as or may overlap each other based on time or may be separated from each other based on time.

Hereinafter, an example in which the display period DP and the touch period TP may be separated from each other based on time will be described by way of example. In this case, the display period DP and the touch period TP may alternate with each other. When the display period DP and the touch period TP are separated from each other based on time while alternating with each other, the touch period may be a blank period in which the display driving may be not performed.

The touch display device 10 can identify or control the display period DP and the touch period TP by generating a synchronization signal Tsync swinging between a high level and a low level. For example, a high level section (or a low level section) of the synchronization signal Tsync may correspond to the display period DP, and a low level section (or a high level section) of the synchronization signal Tsync may correspond to the touch period TP.

With regard to a method by which the display period DP and the touch period TP may be allocated within the time of a single frame, in an example, the time of a single frame may be divided into a single display period DP and a single touch period TP, such that display driving can be performed during the single display period DP and touch driving for sensing a touch input performed by the finger and/or a touch input performed by the active pen 20 can be performed during the single touch period TP corresponding to a blank period.

In another example, the time of a single frame may be divided into two or more display periods DP and two or more touch periods TP based on time. Display driving can be performed for the single frame during two or more display periods DP within the time of a single frame. During two or more touch periods TP corresponding to blank periods within the time of a single frame, touch driving for sensing a touch input performed by the finger and/or a touch input performed by the active pen 20 across the entire area of the screen one time or more may be undertaken, or touch driving for sensing a touch input performed by the finger and/or a touch input performed by the active pen 20 in a portion of the area of the screen may be undertaken.

When the time of a single frame may be divided into two or more display periods DP and two or more touch periods TP based on time, each of two blank periods corresponding to the two or more touch periods within the time of a single frame will be referred to as a "long horizontal blank (LHB)." Here, touch driving performed during two or more LHBs within the time of a single frame will be referred to as "LHB driving."

FIG. 7 illustrates sixteen display periods DP1 to DP 16 and touch periods TP1 to TP16, produced by dividing the time of a single frame based on time, in the touch display device 10 according to an example embodiment. With reference to FIG. 7, the time of a single frame may be divided into sixteen display periods DP1 to DP16 and sixteen touch periods TP1 to TP16 based on time. In this case, the sixteen touch periods TP1 to TP16 correspond to sixteen LHBs LHB #1 to LHB #16.

Hereinafter, a method of sensing a touch input performed by the finger and/or a touch input performed by the active pen 20 in an example in which the time of a single frame may be divided into the sixteen display periods DP1 to DP16 and the sixteen touch periods TP1 to TP16 based on time will be described.

FIG. 8 illustrates a pen searching mode of a touch system according to an example embodiment. FIG. 9 illustrates a pen mode of the touch system according to an example embodiment.

In FIGS. 8 and 9, the sixteen LHBs LHB #1 to LHB #16 may be only illustrated in the time of a single frame illustrated in FIG. 7, from which the sixteen display periods DP1 to DP16 may be omitted. For processing to recognize the active pen 20, the touch system operates in a pen searching mode initially and subsequently may operate in a pen mode.

As illustrated in FIGS. 8 and 9, during the pen searching mode and the pen mode of the touch display device 10, there may be LHB periods in which a beacon signal may be transferred to the active pen 20. For example, the beacon signal may include one or more selected from among touch panel information (e.g., touch panel state information, touch panel identification information, touch panel type information regarding an in-cell type, or the like), panel driving mode information (e.g., identification information regarding either the pen searching mode or the pen mode), pen output signal characteristics information (e.g., a frequency, the number of pulses, or the like), LHB driving information, multiplexer driving information, and power mode information (e.g., LHB information regarding LHBs in which neither panel driving nor pen driving may be enabled to reduce power consumption).

The beacon information may include information regarding driving synchronization between the touchscreen panel TSP and the active pen 20. A variety of information, included in the beacon signal, may be stored in a lookup table of the touch display device 10. The lookup table may be previously shared by the active pen 20.

With reference to FIG. 8, when the pen searching mode may be progressing for the time of a single frame, one or more LHBs, e.g., LHB #1 and LHB #9, among the sixteen LHBs LHB #1 to LHB #16 within the time of a single frame can be used as beacon signal transmission periods BCON. With reference to FIG. 9, when the pen mode may be progressing within the time of a single frame, one or more LHBs, e.g., LHB #1, among the sixteen LHBs LHB #1 to LHB #16 within the time of a single frame can be used as a beacon signal transmission period BCON. When a beacon signal transferred to the touchscreen panel TSP by the touch circuit 300 during the beacon signal transmission period BCON is received through a pen tip, the active pen 20 can recognize a variety of information required for pen driving from the beacon signal.

With reference to FIG. 8, in the pen searching mode, the touch display device 10 may search at least one active pen 20 by full sensing F/S. When the pen searching mode is progressing during the time of a single frame, the touch display device 10 may perform the full sensing F/S in LHBs, e.g., LHB #2 to LHB #8, LHB #10 to LHB #16, among the sixteen LHBs LHB #1 to LHB #16, except for the one or more LHBs, e.g., LHB #1 and LHB #9, corresponding to the beacon signal transmission periods BCON.

The touch circuit 300 of the touch display device 10 can perform the full sensing F/S by simultaneously or sequentially driving all or portions of the touch electrodes TE, and then detecting (or sensing) signals from the touch electrodes TE. The touch circuit 300 can sense the position of a touch input performed by the finger, and may sense the position of the active pen 20 across the entire area of the touchscreen panel TSP.

In the pen searching mode, the touch circuit 300 may simultaneously transfer a panel driving signal (e.g., a touch driving signal) to the touch electrodes TE of the touchscreen panel TSP, or may sequentially transfer a panel driving signal to the touch electrodes TE of the touchscreen panel TSP to drive the touch electrodes TE of the touchscreen panel TSP. The panel driving signal transferred to the touchscreen panel TSP may be then input to the active pen 20 through the pen tip of the active pen 20.

The active pen 20 may generate and emit a signal in response to the input panel driving signal. The pen signal emitted by the active pen 20 may be input to one or more touch electrodes TE, adjacent to the active pen 20, among the plurality of touch electrodes TE of the touchscreen panel TSP. The touch circuit 300 can detect the pen signal input to the one or more touch electrodes TE, and may sense the position (or presence) of the active pen 20 based on the detected pen signal.

When the at least one active pen 20 is searched by the pen searching mode, both the touch display device 10 and the active pen 20 can operate in the pen mode. In the pen mode, the touch display device 10 can sense the position and/or tilt of the active pen 20, and may acquire pen information regarding the active pen 20 (e.g., "pen additional information" or "pen data").

The pen information may include at least one piece of information selected from among, for example, pen identification information regarding the active pen 20, pen button information regarding button input information present in the active pen 20, pressure information regarding an amount of pressure applied to the pen tip of the active pen 20 (also referred to as an amount of pen pressure), state information regarding a battery disposed in the active pen 20, and checksum information regarding data that the active pen 20 transmits and/or receives.

When the pen mode is progressing during the time of a single frame, the remaining LHBs, e.g., LHB #2 to LHB #16, among the sixteen LHBs LHB #1 to LHB #16 within the time of a single frame, except for one or more LHBs, e.g., LHB #1, corresponding to the beacon signal transmission period BCON, maybe: LHB #2, LHB #5, LHB #9, and LHB #13 corresponding to pen position and/or tilt sensing periods PLOC in which the touch circuit 300 may sense the position and/or tilt of the active pen 20; LHB #3, LHB #6, LHB #7, LHB #10, LHB #11, LHB #14, and LHB #15 corresponding to pen information recognition periods DATA in which the touch circuit 300 may recognize pen information regarding the active pen 20 (e.g., pen additional information or pen data); and LHB #4, LHB #8, LHB #12, and LHB #16 corresponding to finger touch sensing periods FLOC in which the touch circuit 300 may sense a touch input performed by the finger or a normal pen.

Hereinafter, the beacon signal transmission periods BCON, the pen position/tilt sensing periods PLOC, the pen information recognition periods DATA, and the finger touch sensing periods FLOC will be described in more detail with reference to FIGS. 10 to 13.

Figure 10:
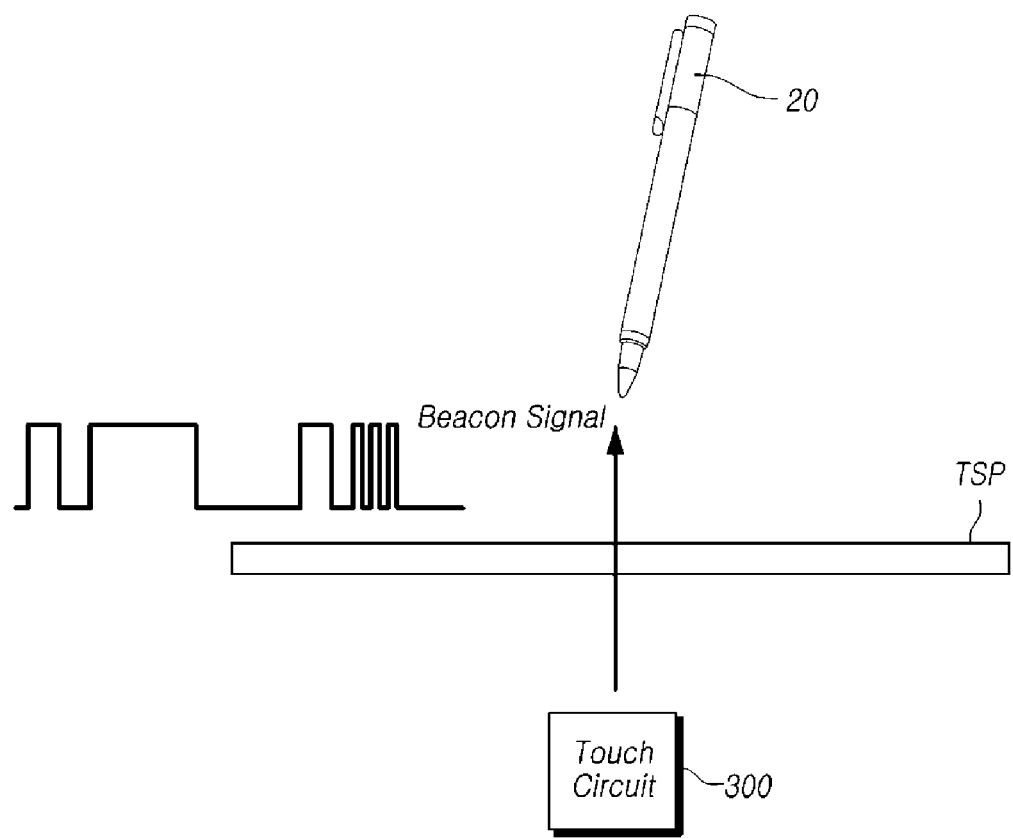
FIG. 10 illustrates an operation during a beacon signal transmission period in the touch system according to an example embodiment.

FIG. 10 illustrates an operation during a beacon signal transmission period in the touch system according to an example embodiment.

With reference to FIG. 10, during an LHB corresponding to the beacon signal transmission period BCON in the pen searching mode and the pen mode, the touch circuit 300 may transfer a beacon signal to the touchscreen panel TSP. Here, the beacon signal may be transferred to all of, or only portions of, the touch electrodes TE. Then, the active pen 20 in contact with or adjacent to the touchscreen panel TSP may receive the beacon signal through the pen tip.

Figure 11:
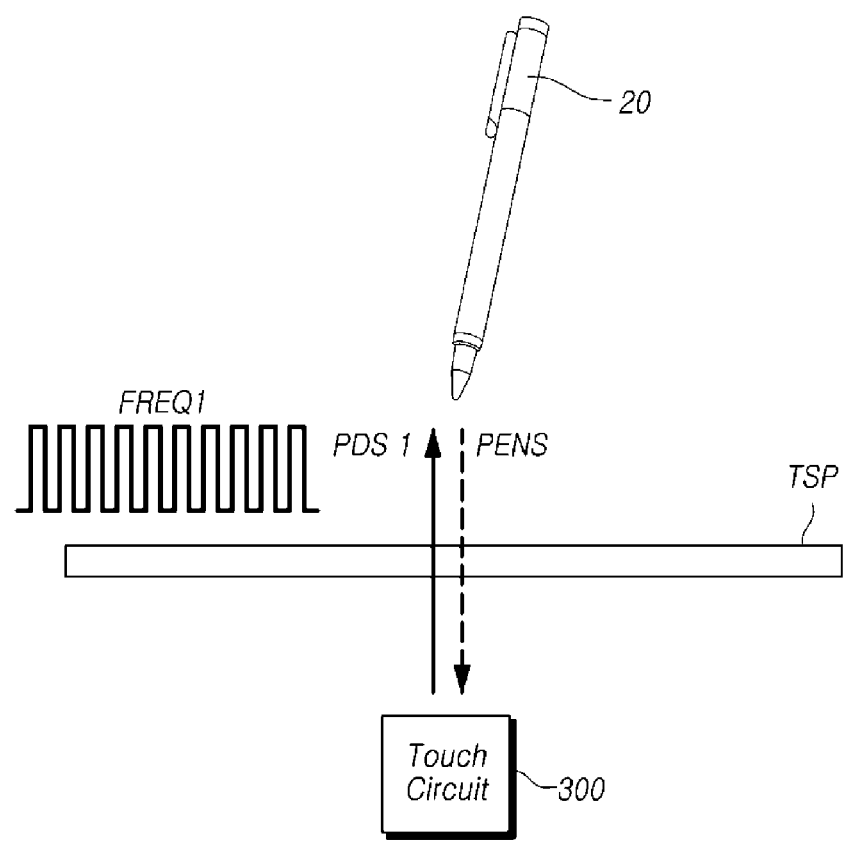
FIG. 11 illustrates an operation during a pen position/tilt sensing period in the touch system according to an example embodiment.

FIG. 11 illustrates an operation during a pen position/tilt sensing period in the touch system according to an example embodiment.

With reference to FIG. 11, during an LHB corresponding to the pen position/tilt sensing period PLOC in the pen mode (or the pen searching mode), the touch circuit 300 may transfer a first panel driving signal PDS1 to the touchscreen panel TSP. The first panel driving signal PDS1 may be a pulse signal, which may include a plurality of pulses having a first frequency FREQ1.

The active pen 20 may receive the first panel driving signal PDS1, transferred to the touchscreen panel TSP, through the pen tip. In response to (or in synchronization with) the received first panel driving signal PDS1, the active pen 20 may output a pen signal PENS. The touch circuit 300 may receive the pen signal PENS, output from the active pen 20, through one or more touch electrodes among the plurality of touch electrodes TE of the touchscreen panel TSP.

Figure 12:
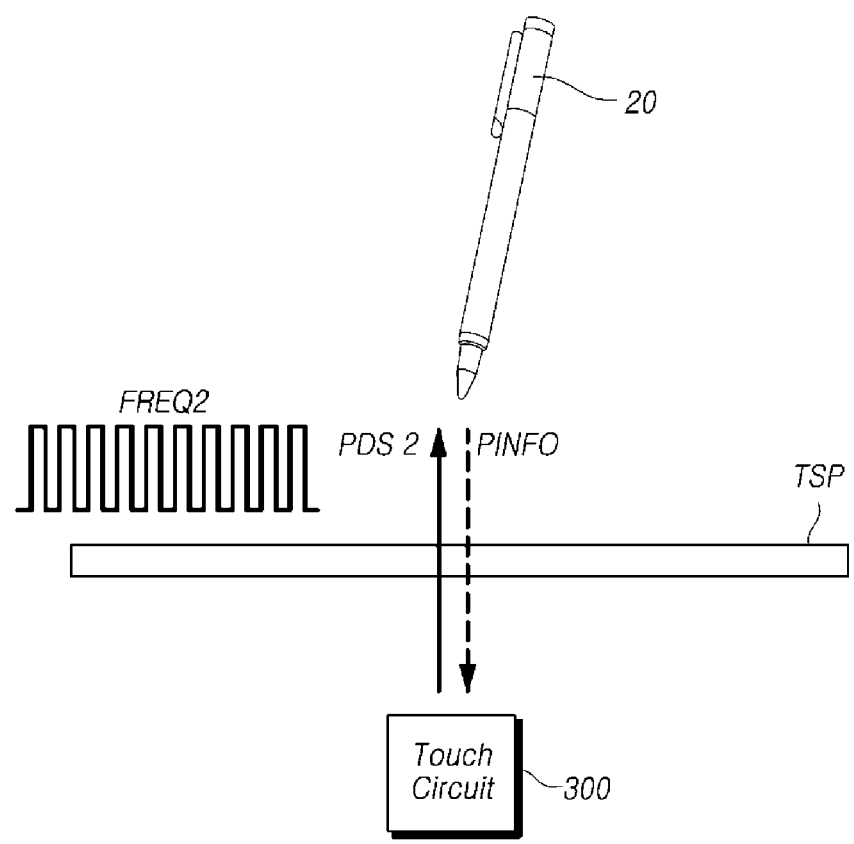
FIG. 12 illustrates an operation during a pen information recognition period in the touch system according to an example embodiment.

FIG. 12 illustrates an operation during a pen information recognition period in the touch system according to an example embodiment.

With reference to FIG. 12, during an LHB corresponding to the pen information recognition period DATA in the pen mode, the touch circuit 300 may transfer a second panel driving signal PDS2 to the touchscreen panel TSP. The second panel driving signal PDS2 may be a pulse signal, which may include a plurality of pulses having a second frequency FREQ2.

The active pen 20 may receive the second panel driving signal PDS2, transferred to the touchscreen panel TSP, through the pen tip. In response to (or in synchronization with) the received second panel driving signal PDS2, the active pen 20 may output a pen information signal PINFO.

The touch circuit 300 may receive the pen information signal PINFO, output from the active pen 20, through one or more touch electrodes among the plurality of touch electrodes TE of the touchscreen panel TSP. The pen information signal PINFO output from the active pen 20 during the pen information recognition period DATA may be a type of pen signal PENS.

The pen signal PENS output from the active pen 20 during the pen position/tilt sensing period PLOC may be a simple pulse signal periodically repeating a high level and a low level without carrying any meaningful information, although embodiments are not limited thereto. Foe example, the pen information signal PINFO output from the active pen 20 during the pen information recognition period DATA may be a pulse signal, a type of pen signal PENS, carrying meaningful information.

Figure 13:
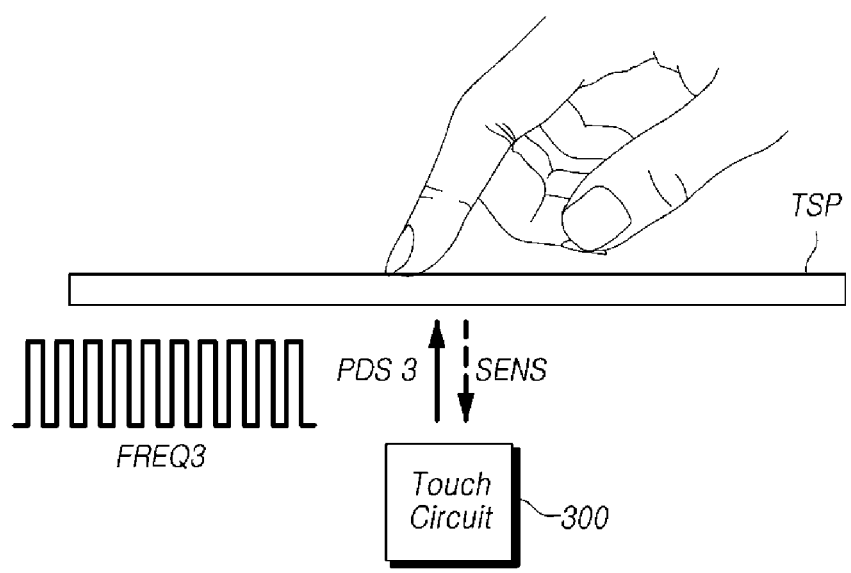
FIG. 13 illustrates an operation during a finger touch sensing period in the touch system according to an example embodiment.

FIG. 13 illustrates an operation during a finger touch sensing period in the touch system according to an example embodiment.

With reference to FIG. 13, during an LHB corresponding to the finger touch sensing period FLOC in the pen mode, the touch circuit 300 may transfer a third panel driving signal PDS3 to the touchscreen panel TSP. The third panel driving signal PDS3 may be a pulse signal, which may include a plurality of pulses having a third frequency FREQ3.

The touch circuit 300 may receive a touch sensing signal SENS through one or more touch electrodes among the plurality of touch electrodes TE of the touchscreen panel TSP to which the third panel driving signal PDS3 may be transferred. The first panel driving signal PDS1, the second panel driving signal PDS2, and the third panel driving signal PDS3, as described above, may be pulse signals respectively including a plurality of pulses. The first to third panel driving signals PDS1 to PDS3 may be the same signals, or at least one panel driving signal may be different from the remaining panel driving signals.

In an example, the first frequency FREQ1 of the first panel driving signal PDS1, the second frequency FREQ2 of the second panel driving signal PDS2, and the third frequency FREQ3 of the third panel driving signal PDS3 may be the same, or at least one frequency may be different from the remaining frequencies. In another example, the amplitudes of the first panel driving signal PDS1, the second panel driving signal PDS2, and the third panel driving signal PDS3 may be the same, or at least one amplitude may be different from the remaining amplitudes.

When the active pen 20 has additional functions or the touch display device 10 provides a variety of additional functions using the active pen 20, the pen information signal PINFO, transferred by the active pen 20 to the touch display device 10, can carry a more variety of and a greater amount of pen information.

However, considering the characteristics of signals output from the active pen 20, when the pen information signal PINFO carries a variety of and a large amount of pen information, the length of the pen information signal PINFO may be increased, thereby taking a longer time for transmitting the pen information signal PINFO.

Therefore, a method able to rapidly transmit the pen information signal PINFO carrying a greater variety of and a large amount of pen information in a limited time (e.g., a predetermined LHB) may be required.

In this regard, it may be desirable to accurately express a large amount of and various types of pen information regarding the active pen 20 in a shorter length (e.g., the length of a symbol string or bit string expressing pen information). That is, it may be necessary to reduce the signal length of the pen information signal PINFO carrying a large amount of and various types of pen information.

Hereinafter, a transmission method able to rapidly transmit a pen information signal PINFO carrying a greater variety of and a greater amount of pen information within a limited time (or a predetermined LHB) and a method of accurately expressing a variety of and a large amount of pen information regarding the active pen 20 in a shorter length (e.g., a shorter length of a symbol string or bit string expressing the pen information) for the transmission will be described.

For the sake of brevity, an example in which the time of a single frame may be divided into sixteen display periods DP1 to DP16 and sixteen touch periods TP1 to TP16, with the sixteen touch periods TP1 to TP16 corresponding to sixteen LHBs LHB #1 to LHB #16, will be described by way of example. That is, an example in which a touch input performed by the finger and/or a touch input performed by the active pen 20 are sensed during the sixteen LHBs LHB #1 to LHB #16 within the time of a single frame will be described by way of example.

Hereinafter, the touchscreen panel TSP will be generally referred to as a "panel." The touchscreen panel TSP may be an external touchscreen panel located outside of the display panel 110 or may be an internal touchscreen panel located within the display panel 110.

The touchscreen panel TSP located within the display panel 110 may mean that the touch electrodes TE may be patterned in the interior of the display panel 110. In an example in which the touchscreen panel TSP may be located within the display panel 110, the touchscreen panel TSP may mean the display panel 110.

Figure 14:
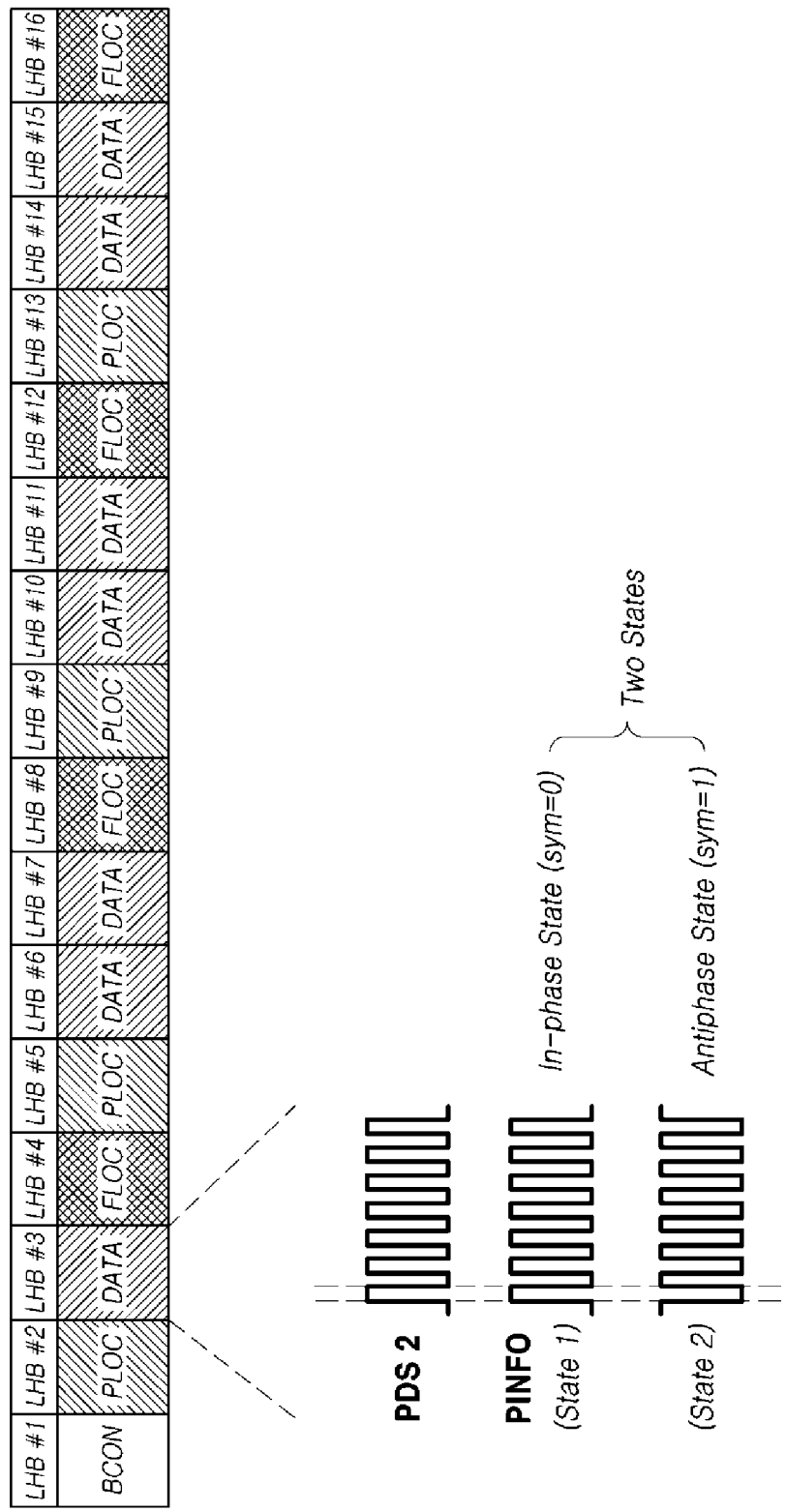
FIG. 14 illustrates two types of state sections in a pen information signal output from the active pen in response to a second panel driving signal in the touch system, according to an example embodiment, in the case in which two states and two symbol values are used in the pen information signal to express pen information.
Figure 16:
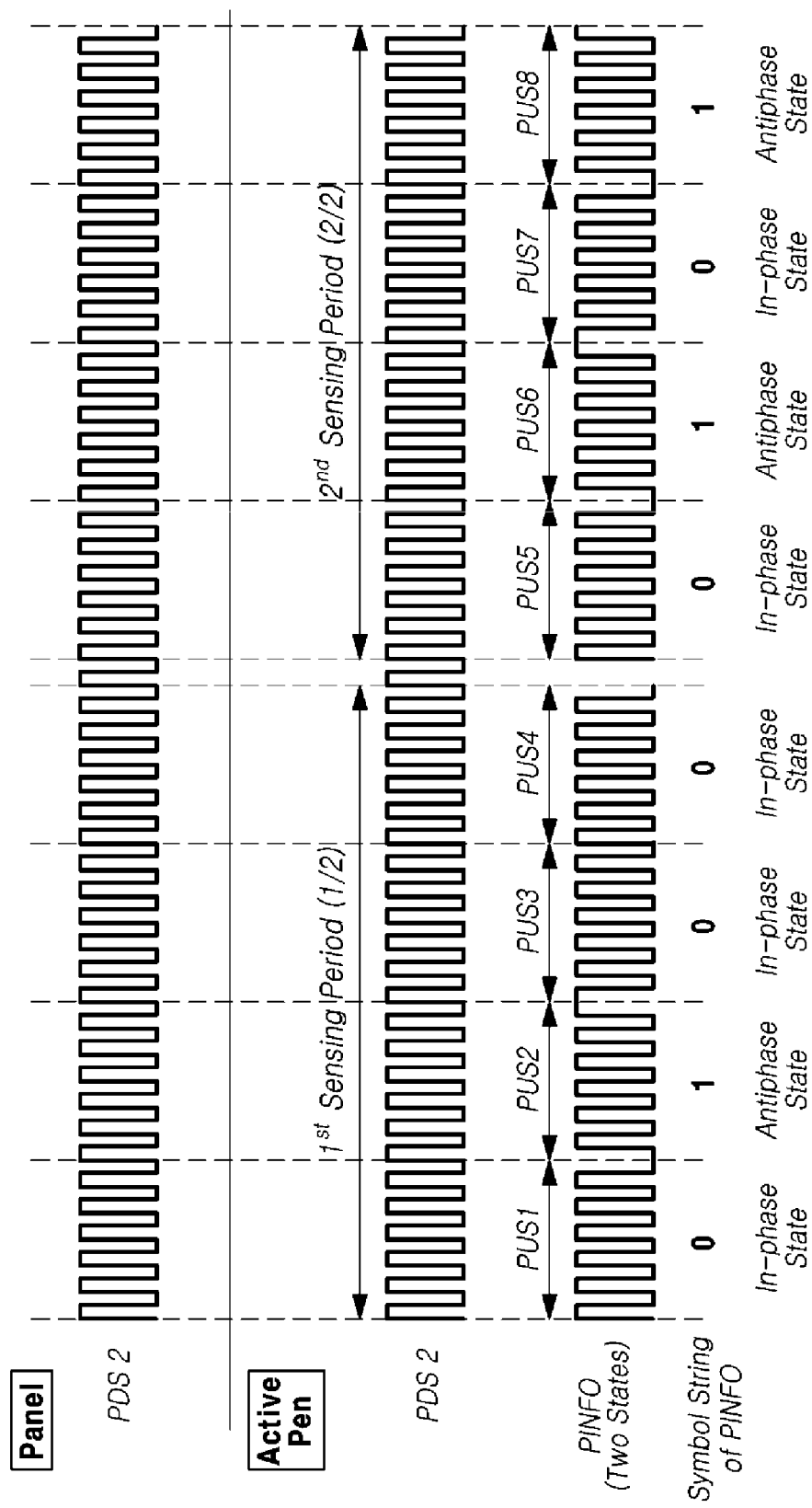
FIG. 16 illustrates signal timing during a pen information recognition period in the touch system according to an example embodiment, in which the pen information of the pen information signal is expressed by an eight-digit symbol string using the two states and the two symbol values.

FIG. 14 illustrates two types of state sections in a pen information signal PINFO output from the active pen 20 in response to a second panel driving signal PDS2 in the touch system, according to an example embodiment, in the case in which two states, e.g., State 1 and State 2, and two symbol values, e.g., 0 and 1, may be used in the pen information signal PINFO to express pen information. FIG. 15 illustrates pen information expressed by a two-digit symbol string and a three-digit symbol string using the two states, e.g., State 1 and State 2, and the two symbol values, e.g., 0 and 1, in the touch system according to an example embodiment. FIG. 16 illustrates signal timing during a pen information recognition period in the touch system according to an example embodiment, in which the pen information of the pen information signal PINFO may be expressed by an eight-digit symbol string using the two states, e.g., State 1 and State 2, and the two symbol values, e.g., 0 and 1.

The touch system according to an example embodiment may include the touch display device 10 and the active pen 20 working in concert with each other. The touch display device 10 may include the touchscreen panel TSP having an arrangement of the plurality of touch electrodes TE, the touch circuit 300 sensing a touch by driving the touchscreen panel TSP, and the like.

Prior to description of the transmission method able to rapidly transmit a pen information signal PINFO carrying a greater variety of and a greater amount of pen information within a limited time (or a predetermined LHB) and a method of accurately expressing a variety of and a large amount of pen information regarding the active pen 20 in a shorter length (e.g., a shorter length of a symbol string or bit string expressing the pen information) for the transmission, several types of touch periods will be discussed first.

The touch display device 10 should sense a touch input performed by the active pen 20 and/or a touch input performed by the finger and recognize pen information regarding the active pen 20 during the sixteen LHBs LHB #1 to LHB #16 corresponding to the sixteen touch periods TP for sensing a touch input to the touchscreen panel TSP within the time of a single frame. In this regard, the sixteen LHBs LHB #1 to LHB #16 corresponding to the sixteen touch periods TP for sensing a touch input to the touchscreen panel TSP within the time of a single frame may be allocated as pen position/tilt sensing periods PLOC, pen information recognition periods DATA, finger touch sensing periods FLOC, and the like.

With reference to FIG. 14, during LHB #2, LHB #5, LHB 9, and LHB 13, allocated as the pen position/tilt sensing periods PLOC, the touch circuit 300 may transfer a first panel driving signal PDS1 to the touchscreen panel TSP, and may receive a pen signal output from the active pen 20 through the touchscreen panel TSP, as illustrated in the FIG. 11 example, to sense at least one of the position and the tilt of the active pen 20 based on the received pen signal.

With further reference to FIG. 14, during LHB #3, LHB #6, LHB 7, LHB 10, LHB #11, LHB #14, and LHB #15, allocated as the pen information recognition periods DATA, the touch circuit 300 can transfer a second panel driving signal PDS2 to the touchscreen panel TSP, and may receive a pen information signal PINFO output from the active pen 20 through the touchscreen panel TSP, as illustrated in the FIG. 12 example, to recognize pen information regarding the active pen 20, expressed in the pen information signal PINFO.

With further reference to FIG. 14, during LHB #4, LHB #8, LHB #12, and LHB #16, allocated as the finger touch sensing periods FLOC, the touch circuit 300 can transfer a third panel driving signal PDS3 to the touchscreen panel TSP, and based on one or more signals received from one or more touch electrodes among the plurality of touch electrodes TE, may sense a touch input performed by the finger or the normal pen.

As described above, through the touch periods, the touch display device 10 can detect the position, tilt, and a variety of additional information of the active pen 20 and detect the position of a normal touch input performed by the finger or the like. Each of the first panel driving signal PDS1, the second panel driving signal PDS2, and the third panel driving signal PDS3 may be a pulse signal including a plurality of pulses, being able to repeatedly swing between a high level and a low level. All of the first panel driving signal PDS1, the second panel driving signal PDS2, and the third panel driving signal PDS3 may have the same frequency.

When the panel driving signals PDS1, PDS2, and PDS3 having different uses are provided with the same frequency, as described above, it can be easier to generate and transfer the panel driving signals PDS1, PDS2, and PDS3, the load of the active pen 20 required to perform different operations (or different types of driving) in response to the panel driving signals PDS1, PDS2, and PDS3 can be reduced, and the overall driving control between the touch display device 10 and the active pen 20 can be performed in a simple manner.

Alternatively, at least one panel driving signal among the first panel driving signal PDS1, the second panel driving signal PDS2, and the third panel driving signal PDS3 may have a different frequency. When at least one panel driving signal among the first panel driving signal PDS1, the second panel driving signal PDS2, and the third panel driving signal PDS3 has a different frequency, as described above, the active pen 20 can accurately perform the corresponding operation (or driving) in response to each of the panel driving signals PDS1, PDS2, and PDS3, and the overall driving control between the touch display device 10 and the active pen 20 can be performed accurately.

In addition, as illustrated in FIG. 14, one or more LHBs, e.g., LHB #1, among the sixteen LHBs LHB #1 to LHB #16 corresponding to the touch periods TP within the time of a single frame, can be allocated as beacon signal transmission periods BCON, such that the touch circuit 300 can notify the active pen 20 of the system operation, the system state, or the like, and may perform driving control in concert with the active pen 20.

During LHB #1 allocated as the beacon signal transmission period BCON, as described above, the touch circuit 300 can transfer a beacon signal to the active pen 20 through the touchscreen panel TSP. The beacon signal transmission period BCON may be present prior to the pen information recognition periods DATA and the pen position/tilt sensing periods PLOC within the limited time, before the next beacon signal transmission period BCON.

For example, the beacon signal may be a signal in which information may be expressed by pulses. The information expressed by pulses may be at least one piece of information selected from among touch panel information (e.g., touch panel state information, touch panel identification information, touch panel type information regarding an in-cell type, or the like), panel driving mode information (e.g., identification information regarding a pen searching mode or a pen mode), pen output signal characteristics information (e.g., information regarding a frequency, the number of pulses, or the like), touch driving information (e.g., LHB driving information), multiplexer driving information, power mode information (e.g., LHB information regarding LHBs in which neither panel driving nor pen driving may be enabled to reduce power consumption), and driving synchronization information for driving synchronization between the touchscreen panel TSP and the active pen 20.

Various types of information included in the beacon signal may be stored in the lookup table in the touch display device 10. The lookup table may be previously shared by the active pen 20.

As described above, the touch circuit 300 may transfer the beacon signal to the active pen 20 through the touchscreen panel TSP before transferring the panel driving signal to the touchscreen panel TSP. In this manner, the touch circuit 300 can notify the active pen 20 of the system operation, system state, or the like in a touch period, thereby accurately performing driving control in concert with the active pen 20.

As described above, during LHB #3, LHB #6, LHB #7, LHB #10, LHB #11, LHB #14, and LHB #15, allocated as the pen information recognition periods DATA, the touch circuit 300 may transfer the second panel driving signal PDS2, for recognition of pen information, to the touchscreen panel TSP.

Then, the active pen 20 may receive the second panel driving signal PDS2, transferred to the touchscreen panel TSP, through the pen tip, may generate a pen information signal PINFO, expressing a variety of predetermined pen information in response to the input second panel driving signal PDS2, and may output the pen information signal PINFO at a predetermined point in time.

The touch circuit 300 may receive the pen information signal PINFO, output from the active pen 20 in response to the second panel driving signal PDS2, through the touchscreen panel TSP. The touch circuit 300 can recognize pen information regarding the active pen 20, based on the received pen information signal PINFO.

The pen information may be information transferred from the active pen 20 to the touch display device 10. The pen information may include, as various types of additional information regarding the active pen 20, at least one piece of information selected from among, for example, pen identification information, pen button information, a pressure (or a pen pressure), battery state information, and checksum information.

The touch display device 10 can accurately recognize the state or information of the active pen 20, recognize a user action in the active pen 20, recognize the integrity of information transmitted to and/or received from the active pen 20, or accurately perform functions related to the active pen 20, by recognizing the pen information.

As illustrated in the FIG. 14 example, each of the second panel driving signal PDS2 and the pen information signal PINFO may be a pulse signal including a plurality of pulses. The pen information signal PINFO can be generated in synchronization with the second panel driving signal PDS2.

Then, the frequency of the pen information signal PINFO may be the same as or substantially the same as the frequency of the second panel driving signal PDS2. The frequency of the pen information signal PINFO being "substantially the same" as the frequency of the second panel driving signal PDS2 means that the frequency of the pen information signal PINFO differs from the frequency of the second panel driving signal PDS2 within a predetermined tolerance range.

The pen information signal PINFO may include pulses indicating a symbol string including a plurality of symbols. In the pen information signal PINFO, the symbol string may refer to pen information, and each symbol may be a portion of the pen information. The symbol and the symbol string may be referred to as a bit and a bit string, or may be referred to as a character and a character string. The number of types of values of symbols (e.g., symbol values) used to express the pen information may be predetermined.

The pulses of the pen information signal PINFO may have one or more pulse sections. Each of the pulse sections expresses a single symbol value sym. The pulse sections may have the same length of time. The pulse sections may have the same number of pulses. Each of the pulse sections may have a state corresponding to a symbol value sym.

As illustrated in FIGS. 14 to 16, the active pen 20 can compose a symbol string indicating pen information using two types of symbol values, e.g., 0 and 1, and can generate a pen information signal PINFO including pulses corresponding to the symbol string.

With reference to FIG. 14, in the symbol string indicating pen information, the symbol value sym of each symbol may be one of two symbol values, e.g., 0 and 1. The "first symbol value, e.g., 0" of the two symbol values, e.g., 0 and 1, may express pulses in phase with (or having the same phase as) the pulses of the second panel driving signal PDS2.

The pulses expressed by the first symbol value, e.g., 0, may be referred to as having an "in-phase state State 1." In addition, a pulse section including pulses expressed by the first symbol value, e.g., 0, may be referred to as an "in-phase state section."

The "second symbol value 1" of the two symbol values, e.g., 0 and 1, may express pulses having a different phase (or pulses having a phase difference of 180°) from the pulses of the second panel driving signal PDS2. As described above, the pulses expressed by the second symbol value, e.g., 1, may be also referred to as having an "antiphase state State 2." In addition, a pulse section including the pulses expressing the second symbol value, e.g., 1, may be referred to as an "antiphase state section."

In the pen information signal PINFO, the in-phase state section, as the pulse section including pulses expressed by the first symbol value, e.g., 0, and the antiphase state section, as the pulse section including pulses expressed by the second symbol value, e.g., 1, may have the same number of pulses or the same length of time. As described above, the ability of the pen information signal PINFO to express information in the same pulse length may be determined depending on the number of types of symbol values sym.

As described above, in an example in which the pen information signal PINFO may be generated using two types of symbol values, e.g., 0 and 1, for example, in a case in which the generated pen information signal PINFO may include one or more state sections selected from among the in-phase state section, for example, a pulse section including pulses expressed by the first symbol value, e.g., 0, and the antiphase state section, for example, a pulse section including pulses expressed by the second symbol value, e.g., 1, the ability of the pen information signal PINFO to express information will be described by way of example with reference to FIG. 15.

With reference to FIG. 15, when the pen information signal PINFO expresses pen information using pulses corresponding to two symbols, for example, when the pen information is expressed by pulses corresponding to a two-digit symbol string, each of the first symbol and the second symbol in the two-digit symbol string may be one of the first and second symbol values, e.g., 0 and 1. Thus, four two-digit symbol strings e.g., 00, 01, 10, and 11 can be produced using the two types of symbol values, e.g., 0 and 1.

When the pen information signal PINFO expresses pen information using the pulses corresponding to the two-digit symbol string and each of the symbols can have two symbol values, e.g., 0 and 1, the number of expressible types of pen information may be expressed by ($2^2$=4), produced by multiplying the number of types of symbol values, e.g., 2, by the digit number of the symbols, e.g., 2.

In an example, when the two-digit symbol string is "00", the pen information signal PINFO sequentially may include a first in-phase state section including pulses expressed by the first symbol value, e.g., 0, and a second in-phase state section including pulses expressed by the first symbol value, e.g., 0.

In another example, when the two-digit symbol string is "01", the pen information signal PINFO may sequentially include an in-phase state section including pulses expressed by the first symbol value, e.g., 0, and an antiphase state section including pulses expressed by the second symbol value, e.g., 1.

In another example, when the two-digit symbol string is "10", the pen information signal PINFO may sequentially include an antiphase state section including pulses expressed by the second symbol value, e.g., 1, and an in-phase state section including pulses expressed by the first symbol value, e.g., 0.

In another example, when the two-digit symbol string is "11", the pen information signal PINFO sequentially may include a first antiphase state section including pulses expressed by the second symbol value, e.g., 1, and a second antiphase state section including pulses expressed by the second symbol value, e.g., 1.

With reference to FIG. 15, when the pen information signal PINFO expresses pen information using pulses corresponding to three symbols, e.g., when the pen information signal PINFO expresses pen information using pulses corresponding to a three-digit symbol string, each of first to third symbols of the three-digit symbol string may be one of first and second symbol values, e.g., 0 and 1.

Thus, eight three-digit symbol strings, e.g., 000, 001, 010, 011, 100, 101, 110, and 111 can be produced using the two types of symbol values, e.g., 0 and 1.

When the pen information signal PINFO expresses pen information using the pulses corresponding to the three-digit symbol string and each of the symbols can have two symbol values, e.g., 0 and 1, the number of expressible types of pen information may be expressed by $2^3$=8, produced by multiplying the number of types of symbol values, e.g., 2, by the digit number of the symbols, e.g., 3.

In an example, when the three-digit symbol string is "000", the pen information signal PINFO may include three in-phase state sections respectively including pulses expressed by the first symbol value, e.g., 0. In another example, when the three-digit symbol string is "010", the pen information signal PINFO sequentially may include an in-phase state section including pulses expressed by the first symbol value, e.g., 0, an antiphase state section including pulses expressed by the second symbol value, e.g., 1, and an in-phase state section including pulses expressed by the first symbol value, e.g., 0.

The illustration of FIG. 16 is an example in which the pen information signal PINFO may include pulses indicating an eight-digit symbol string, e.g., 01000101, expressing pen information. The pulses indicating the first four digits of the eight-digit symbol string may be output during a first sensing period (1/2), while the pulses indicating the final four digits of the eight-digit symbol string may be output during a second sensing period (2/2).

Eight symbol sections (e.g., pulse sections or signal sections) PUS1 to PUS8 of the eight-digit symbol string, e.g., 01000101, may have the same number of pulses or the same time length, or may have different numbers of pulses or different time lengths. The pulses indicating the eight-digit symbol string, e.g., 01000101, with which the pen information signal PINFO expresses pen information may sequentially have an in-phase state section, an antiphase state section, an in-phase state section, an in-phase state section, an in-phase state section, an antiphase state section, an in-phase state section, and an antiphase state section.

Figure 17:
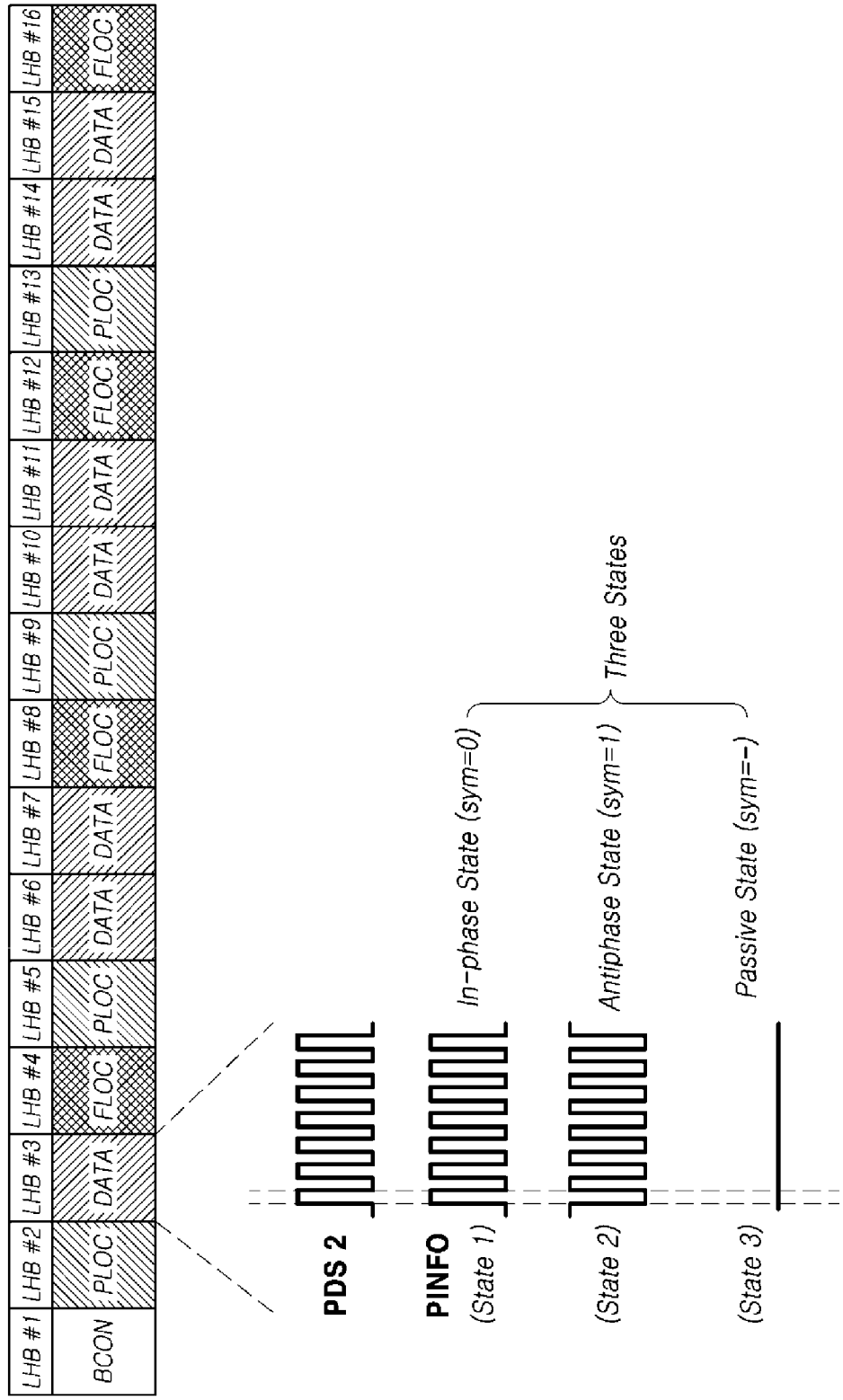
FIG. 17 illustrates three types of state sections in a pen information signal output from the active pen in response to a second panel driving signal in the touch system according to an example embodiment in the case in which three states and three symbol values are used in the pen information signal to express pen information.
Figure 19:
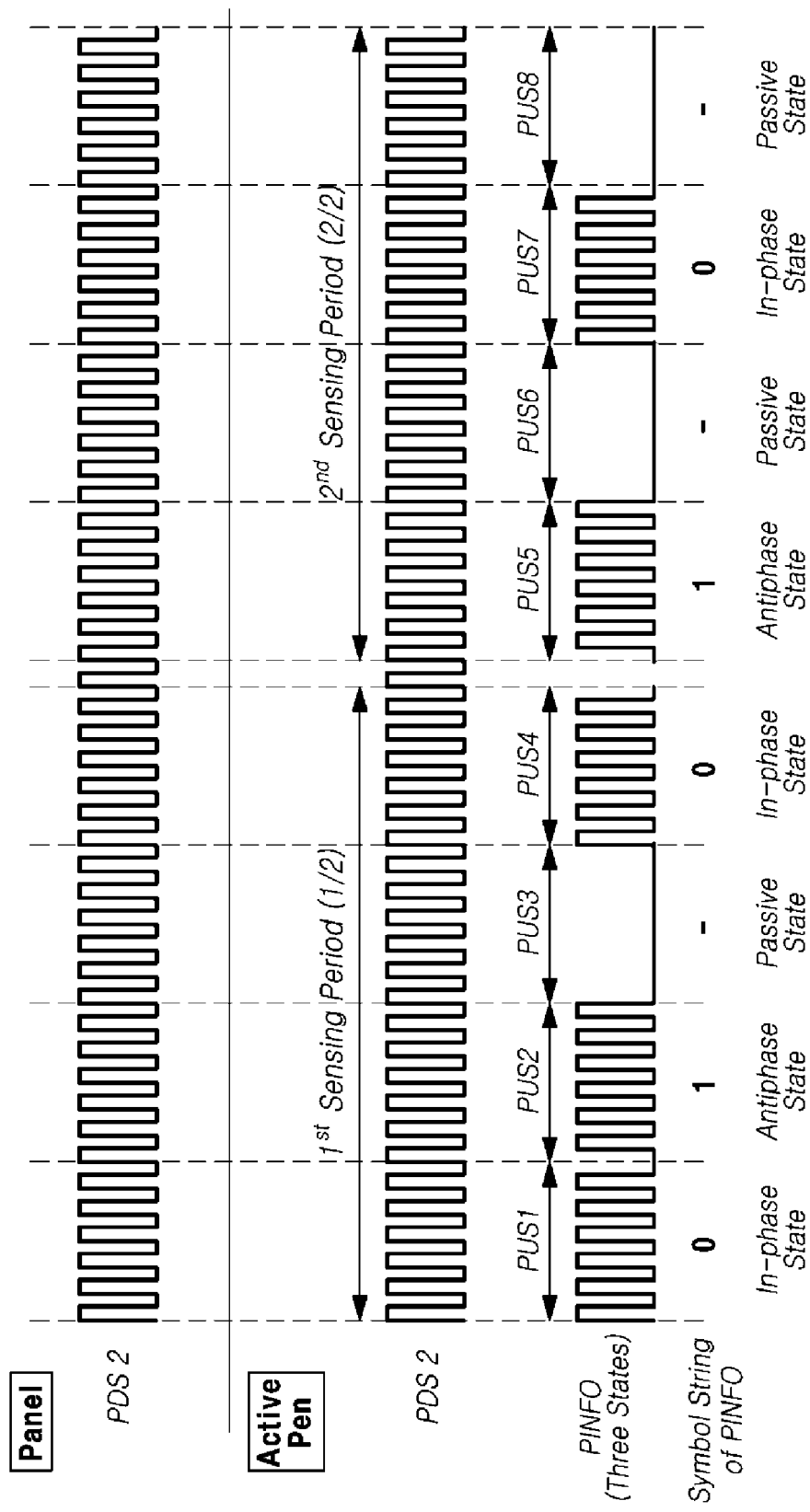
FIG. 19 illustrates signal timing during a pen information recognition period in the touch system according to an example embodiment, in which the pen information of the pen information signal is expressed by an eight-digit symbol string using the three states and the three symbol values.
Figure 20:
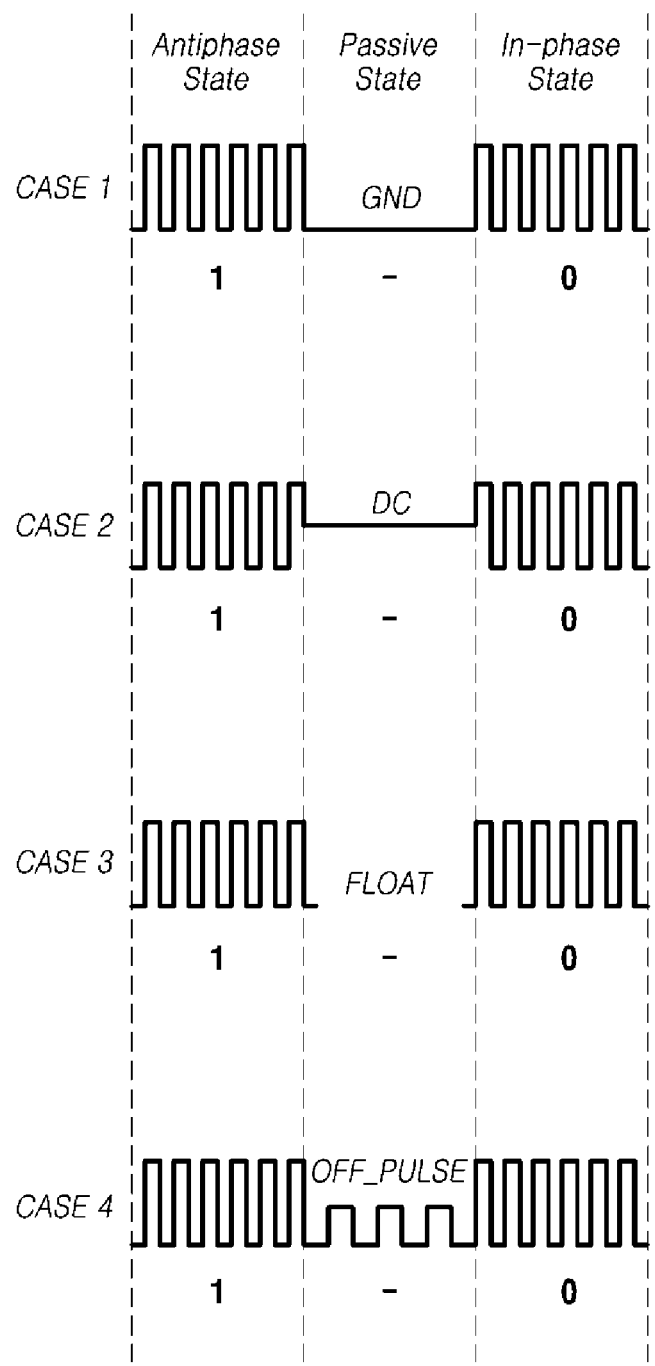
FIG. 20 illustrates four types of examples of a passive state section in the three state sections in the pen information signal output from the active pen in response to the second panel driving signal in the touch system according to an example embodiment, in the case in which the three states and the three symbol values are used in the pen information signal to express pen information.

FIG. 17 illustrates three types of state sections in a pen information signal PINFO output from the active pen 20 in response to a second panel driving signal PDS2 in the touch system according to an example embodiment, in the case in which three states, e.g., State 1, State 2, and State 3, and three symbol values, e.g., 0, 1, and (–), may be used in the pen information signal PINFO to express pen information. FIG. 18 illustrates pen information expressed by a two-digit symbol string and a three-digit symbol string using the three states, e.g., State 1, State 2, and State 3, and the three symbol values, e.g., 0, 1, and (–), in the touch system according to an example embodiment. FIG. 19 illustrates signal timing during a pen information recognition period in the touch system according to an example embodiment, in which the pen information of the pen information signal PINFO may be expressed by an eight-digit symbol string using the three states, e.g., State 1, State 2, and State 3, and the three symbol values, e.g., 0, 1, and (−). In addition, FIG. 20 illustrates four types of examples of a passive state section in the three state sections in the pen information signal PINFO output from the active pen 20 in response to the second panel driving signal PDS2 in the touch system according to an example embodiment, in the case in which the three states, e.g., State 1, State 2, and State 3, and the three symbol values, e.g., 0, 1, and (−), may be used in the pen information signal PINFO to express pen information.

As illustrated in FIGS. 17 to 19, it may be possible to rapidly transmit the pen information signal PINFO including a greater variety of and a large amount of pen information within a limited time (e.g., a predetermined LHB). In this regard, to accurately express a variety of and a large amount of pen information regarding the active pen 20 in a shorter length (e.g., the length of a symbol string or a bit string indicating pen information), the third symbol value (−) indicating a signal state corresponding to a passive state may be additionally used, in addition to the first symbol value, e.g., 0 corresponding to the in-phase state and the second symbol value, e.g., 1 corresponding to the antiphase state. The active pen 20 can form a symbol string indicating pen information by an intended number of digits using three types of symbol values, e.g., 0, 1, and (−), and can generate a pen information signal PINFO including pulses corresponding to the symbol string.

With reference to FIG. 17, in the symbol string indicating pen information, the symbol value sym of each symbol may be one of three symbol values, e.g., 0, 1, and (−). The "first symbol value, e.g., 0" of the three symbol values, e.g., 0, 1, and (−), may be expressed using pulses in phase with the pulses of the second panel driving signal PDS2.

The pulses expressed by the first symbol value, e.g., 0, may be referred to as having an "in-phase state State 1." In addition, a pulse section including the pulses expressed by the first symbol value, e.g., 0 may be referred to as an "in-phase state section."

The "second symbol value 1" of the three symbol values, e.g., 0, 1, and (−), may be expressed using pulses having a different phase (or pulses having a phase difference of 180° from the pulses of the second panel driving signal PDS2. The pulses expressed by the second symbol value, e.g., 1, may be referred to as having an "antiphase state State 2." In addition, a pulse section including the pulses expressed by the second symbol value, e.g., 1 may be referred to as an "antiphase state section."

The "third symbol value (−)" of the three symbol values, e.g., 0, 1, and (−), may be a value different from either the first symbol value, e.g., 0 or the second symbol value, e.g., 1. The "third symbol value (−)" can be expressed in a signal form or a signal output state distinguishable from the in-phase state section and the antiphase state section.

As described above, in the pen information signal PINFO, the section expressed by the third symbol value, e.g., (−) may be referred to as having a "passive state State 3." In addition, in the pen information signal PINFO, a section expressed by the third symbol value, e.g., (−), may be referred to as a "passive state section." The passive state section may be a section distinguished from the in-phase state section and the antiphase state section.

With reference to FIG. 20, the passive state section may be one selected from among, for example, a ground voltage section GND having a ground voltage, a DC voltage section DC having a specific DC voltage except for the ground voltage, a floating section FLOAT in which the signal may be temporarily interrupted (or stopped) when no voltage or signal is output from the active pen 20, and a pulse section OFF_PULSE including pulses distinguishable from the pulses in the in-phase section and the antiphase section. The ground voltage section GND and the DC voltage section DC may be regarded as pulse sections, the amplitudes of which may be zero (0). Because the passive state section can be embodied in a variety of forms, as described above, the passive state section can be embodied to be suitable for environments in which the active pen 20 and the touch circuit 300 may be driven.

In the pen information signal PINFO, the in-phase state section, as a pulse section including pulses expressed by the first symbol value, e.g., 0, the antiphase state section, as a pulse section including pulses expressed by the second symbol value, e.g., 1, and the passive state section expressed by the third symbol value, e.g., (−) may have the same number of pulses or the same time length. As described above, the ability of the pen information signal PINFO to express information in the same pulse length may be determined depending on the number of types of symbol values sym.

An example in which the pen information signal PINFO is generated using three types of symbol values, e.g., 0, 1, and (−), as described above, e.g., in a case in which the generated pen information signal PINFO may include one or more state sections selected from among the in-phase state section, for example, a pulse section including pulses expressed by the first symbol value, e.g., 0, the antiphase state section, for example, a pulse section including pulses expressed by the second symbol value, e.g., 1, and the passive state section expressed by the third symbol value, e.g., (−), the ability of the pen information signal PINFO to express information will be described by way of example with reference to FIG. 18.

With reference to FIG. 18, when the pen information signal PINFO expresses pen information using pulses corresponding to two symbols, e.g., when the pen information is expressed by pulses corresponding to a two-digit symbol string, each of the first symbol and the second symbol in the two-digit symbol string may be one of the first to third symbol values, e.g., 0, 1, and (−).

Thus, nine two-digit symbol strings, e.g., 00, 01, 0-, 10, 11, 1-, -0, -1, and --, can be produced using the three types of symbol values, e.g., 0, 1, and (−). When the pen information signal PINFO expresses pen information using the pulses corresponding to the two-digit symbol string and each of the symbols can have three symbol values, e.g., 0, 1, and (−), the number of expressible types of pen information may be expressed by ($3^2=9$), produced by multiplying the number of types of symbol values, e.g., 3, by the digit number of the symbols, e.g., 2.

In an example, when the two-digit symbol string is, e.g., "01", the pen information signal PINFO may sequentially include an in-phase state section including pulses expressed by the first symbol value, e.g., 0, and an antiphase state section including pulses expressed by the second symbol value, e.g., 1. In another example, when the two-digit symbol string may be, e.g., "1-", the pen information signal PINFO sequentially may include an antiphase state section including pulses expressed by the second symbol value, e.g., 1, and a passive state section expressed by the third symbol value, e.g., (−).

In a comparison of FIG. 18 to FIG. 14, in an example in which pen information is expressed by the two-digit symbol strings having the same length, as illustrated in FIG. 14, when two symbol values, e.g., 0 and 1, are used, the number of types of pen information that the two-digit symbol string can express may be 4 ($=2^2$). However, as illustrated in FIG.

18, when three symbol values, e.g., 0, 1, and (-), are used, the number of types of pen information that the two-digit symbol string can express may be 9 (=3²).

In an example in which the three symbol values, e.g., 0, 1, and (-), are used, a greater amount of information can be expressed when the signal length of the pen information signal PINFO may be the same (e.g., the symbol string length may be the same), as compared to the case in which the two symbol values, e.g., 0 and 1, may be used. In other words, increases in the types of the symbol values (e.g., increases in the variety of a signal pattern corresponding to the types of the symbol values) may allow a greater amount of information to be expressed when the signal length of the pen information signal PINFO may be the same (e.g., the symbol string length may be the same).

As described above, it may be possible to further increase the amount of pen information that the pen information signal PINFO can carry within a predetermined limited time. Thus, the touch display device 10 can more accurately and rapidly recognize a greater amount of pen information regarding the active pen 20.

With reference to FIG. 18, when the pen information signal PINFO expresses the pen information using pulses corresponding to the three symbols (e.g., the pen information may be expressed using pulses corresponding to three-digit symbol strings), each of the first to third symbols in the three-digit symbol string may be one of the first to third symbol values, e.g., 0, 1, and (-). Thus, a total of twenty-seven (27) three-digit symbol strings, e.g., 000, 001, 00-, 010, 011, 01-, . . . , --0, --1, and ---, can be produced using the three symbol values, e.g., 0, 1, and (-).

When the pen information signal PINFO expresses pen information using the pulses corresponding to the three-digit symbol string and each of the symbols can have three symbol values, e.g., 0, 1, and (-), the number of expressible types of pen information may be expressed by (3³=27), produced by multiplying the number of types of symbol values, e.g., 3, by the digit number of the symbols, e.g., 3.

In an example, when the three-digit symbol string is "010", the pen information signal PINFO may sequentially include an in-phase state section including pulses expressed by the first symbol value, e.g., 0, an antiphase state section including pulses expressed by the second symbol value, e.g., 1, and an in-phase state section including pulses expressed by the first symbol value, e.g., 0.

In another example, when the three-digit symbol string is "01-", the pen information signal PINFO may sequentially include an in-phase state section including pulses expressed by the first symbol value, e.g., 0, an antiphase state section including pulses expressed by the second symbol value, e.g., 1, and a passive state section expressed by the third symbol value, e.g., (-).

In a comparison of FIG. 18 to FIG. 14, in an example in which pen information may be expressed by the three-digit symbol strings having the same length, as illustrated in FIG. 14, when two symbol values, e.g., 0 and 1, are used, the number of types of pen information that the three-digit symbol string can express may be 8 (=2³). However, as illustrated in FIG. 18, when three symbol values, e.g., 0, 1, and (-), are used, the number of types of pen information that the three-digit symbol string can express may be 27 (=3³).

In an example in which the three symbol values, e.g., 0, 1, and (-), are used, a greater amount of information can be expressed when the signal length of the pen information signal PINFO may be the same (e.g., the symbol string length may be the same), as compared to an example in which the two symbol values, e.g., 0 and 1, may be used.

In other words, increases in the types of the symbol values (e.g., increases in the variety of signal patterns corresponding to the types of symbol values) may allow a greater amount of information to be expressed when the signal length of the pen information signal PINFO is the same (e.g., the symbol string length may be the same).

The illustration of FIG. 19 is an example in which the pen information signal PINFO may include pulses indicating an eight-digit symbol string, e.g., 01-01-0-, expressing pen information. The pulses indicating the first four digits of the eight-digit symbol string may be output during a first sensing period (1/2), while the pulses indicating the final four digits of the eight-digit symbol string may be output during a second sensing period (2/2).

Eight symbol sections (e.g., pulse sections or signal sections) PUS1 to PUS8 of the eight-digit symbol string, e.g., 01-01-0-, may have the same number of pulses or the same time length, or may have different numbers of pulses or different time lengths. The pulses indicating the eight-digit symbol string, e.g., 01-01-0-, with which the pen information signal PINFO expresses pen information, may sequentially have an in-phase state section, an antiphase state section, a passive state section, an in-phase state section, an antiphase state section, a passive state section, an in-phase state section, and a passive state section.

An example in which the active pen 20 generates a pen information signal PINFO, including pulses corresponding to the symbol string indicating pen information to be expressed, using three symbol values, e.g., 0, 1, and (-), and transmits the generated pen information signal PINFO, as described above, will be re-described briefly.

In this case, the pen information signal PINFO may include one or more sections of one or more types among an in-phase state section corresponding to the first symbol value, e.g., 0, an antiphase state section corresponding to the second symbol value, e.g., 1, and a passage state section corresponding to the third symbol value, e.g., (-). The first symbol value, e.g., 0, the second symbol value, e.g., 1, and the third symbol value, e.g., (-), may be different values, which may be set variously.

The touch circuit 300 can receive the pen information signal PINFO, and, based on the type of the signal (e.g., a pulse form, a voltage output situation, or the like), may identify the in-phase state section, the antiphase state section, and the passage state section. In the pen information signal PINFO, the in-phase state section indicates the first symbol value, e.g., 0, the antiphase state section indicates the second symbol value, e.g., 1, and the passive state section indicates the third symbol value, e.g., (-).

The ability of the pen information signal PINFO to express information (or the amount of information that the pen information signal PINFO can carry), in an example in which the length of the pen information signal PINFO, transmittable within a predetermined limited time, is an N-digit symbol string (e.g., an N-digit bit string or an N-digit character string), will be described.

The pen information signal PINFO may include N number of signal sections (where N≥1) selected from among three types of state sections, at least one type of which can be repeatedly selected. The three types of state sections may include the in-phase state section corresponding to the first symbol value, e.g., 0, the antiphase state section corresponding to the second symbol value, e.g., 1, and the passive state section corresponding to the third symbol value, e.g., (-).

The pen information signal PINFO may indicates an N-digit symbol string including N number of symbol values selected from among three types of symbol values, at least one of which can be repeatedly selected. The three types of symbol values may include the first symbol value, e.g., 0, the second symbol value, e.g., 1, and the third symbol value, e.g., (-). The N-digit symbol string may express pen information regarding the active pen 20.

The number of types of N-digit symbol strings that can be expressed using the pen information signal PINFO may be $3^N$. As described above, the use of the three symbol values, e.g., 0, 1, and (-), can increase the amount of pen information that the pen information signal PINFO can carry within a predetermined limited time, as compared to the use of the two symbol values, e.g., 0 and 1.

In addition, in the pen information signal PINFO, the pulses may have a predetermined duty ratio. When the pulses in the pen information signal PINFO have a predetermined duty ratio, the active pen 20 can more easily generate the pen information signal PINFO, and the touch circuit 300 can more easily obtain pen information from the pen information signal PINFO.

Alternatively, in the pen information signal PINFO, the pulses may have a variable duty ratio. When the pulses in the pen information signal PINFO have a variable duty ratio, it may be possible to diversify the pulse states of the pen information signal PINFO by controlling the duty ratio. This can consequently further increase the amount of pen information that the pen information signal PINFO can carry within a predetermined limited time.

In addition, in the pen information signal PINFO, the pulses may have a predetermined amplitude (e.g., a predetermined difference between a high level voltage and a low level voltage). When the pulses in the pen information signal PINFO have a predetermined amplitude, the active pen 20 can more easily generate the pen information signal PINFO, and the touch circuit 300 can more easily obtain pen information from the pen information signal PINFO.

Alternatively, in the pen information signal PINFO, the amplitude (e.g., difference between a high level voltage and a low level voltage) of the pulses may be variable. When the pulses in the pen information signal PINFO have a variable amplitude, as described above, it may be possible to diversify the pulse states of the pen information signal PINFO by amplitude variable control. This can consequently further increase the amount of pen information that the pen information signal PINFO can carry within a predetermined limited time.

Hereinafter, a method of diversifying pulse states in a pen information signal PINFO by duty ratio variable control over pulses in the pen information signal PINFO, thereby further increasing the amount of pen information that the pen information signal PINFO can carry within a predetermined limited time, will be described with reference to FIGS. 21 to 23.

Subsequently, a method of diversifying pulse states in a pen information signal PINFO by amplitude variable control over pulses in the pen information signal PINFO, thereby further increasing the amount of pen information that the pen information signal PINFO can carry within a predetermined limited time (e.g., a pen information recognition period), will be described with reference to FIGS. 24 to 26.

Figure 21:
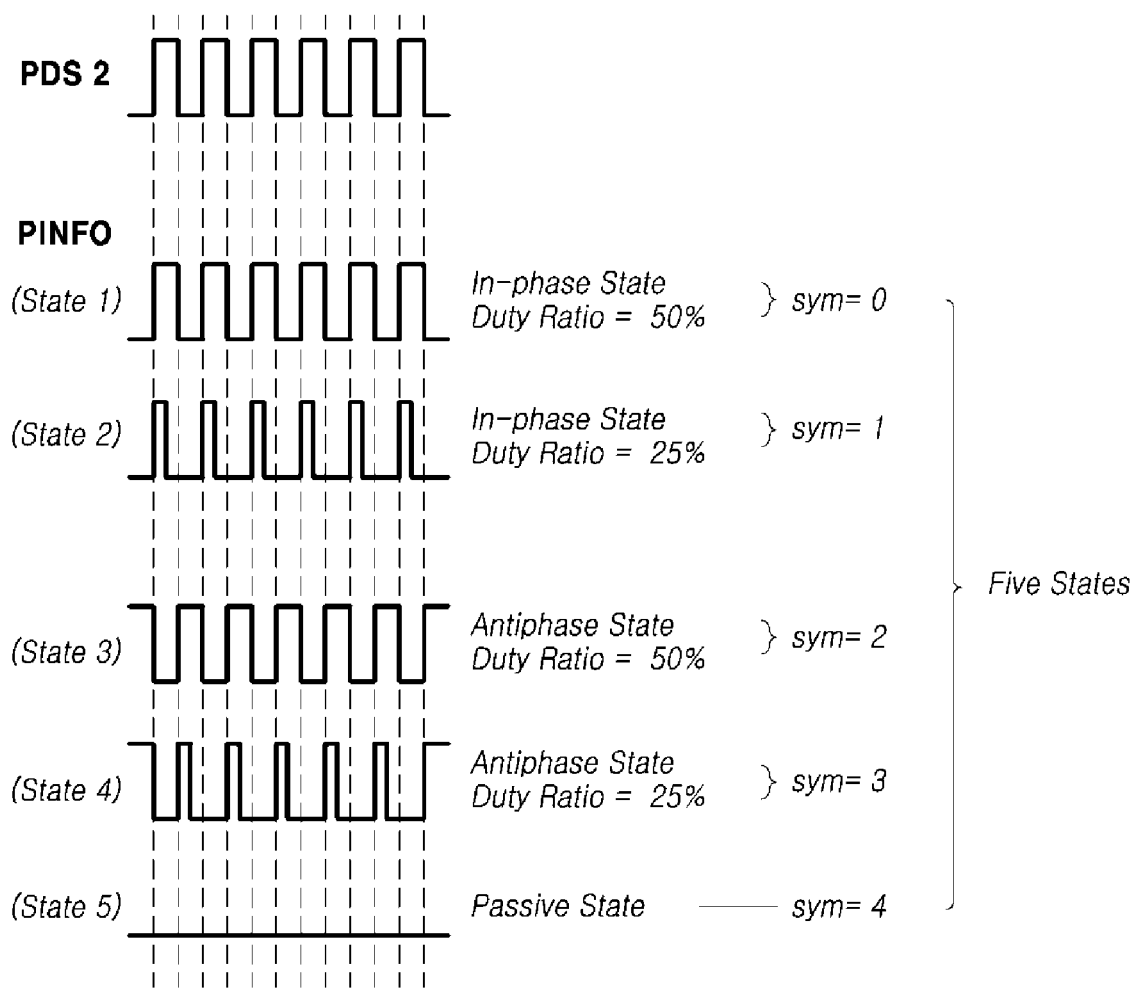
FIG. 21 illustrates five types of state sections in a pen information signal in the touch system according to an example embodiment, in the case in which five states and five symbol values are used by duty ratio variable control to further increase the amount of pen information that the pen information signal can carry within a predetermined limited time.

FIG. 21 illustrates five types of state sections in a pen information signal PINFO in the touch system according to an example embodiment, in an example in which five states, e.g., State 1, State 2, State 3, State 4, and State 5, and five symbol values, e.g., 0, 1, 2, 3, and 4, are used by duty ratio variable control to further increase the amount of pen information that the pen information signal PINFO can carry within a predetermined limited time.

With reference to FIG. 21, an in-phase state section may include a first duty ratio control in-phase state section in which pulses have a first duty ratio 50%, and a second duty ratio control in-phase state section in which pulses have a second duty ratio 25%. With further reference to FIG. 21, an antiphase state section may include a first duty ratio control antiphase state section in which pulses have a first duty ratio 50%, and a second duty ratio control antiphase state section in which pulses have a second duty ratio 25%.

Thus, the pen information signal PINFO may include one or more state sections selected from among a total of five state sections, including the first duty ratio control in-phase state section, the second duty ratio control in-phase state section, the first duty ratio control antiphase state section, the second duty ratio control antiphase state section, and a passive state section. The first duty ratio control in-phase state section, the second duty ratio control in-phase state section, the first duty ratio control antiphase state section, the second duty ratio control antiphase state section, and the passive state section may correspond to different symbol values.

For example, the first duty ratio control in-phase state section may express a first symbol value, e.g., 0, the second duty ratio control in-phase state section expresses a second symbol value, e.g., 1, the first duty ratio control antiphase state section expresses a third symbol value, e.g., 2, the second duty ratio control antiphase state section expresses a fourth symbol value, e.g., 3, and the passive state section expresses a fifth symbol value, e.g., 4.

When the pen information signal PINFO includes pulses corresponding to an N-digit symbol string to express pen information, the pen information signal PINFO may include N number of signal sections selected from among five types of state sections, at least one of which can be repeatedly selected. The five types of state sections may include two types of duty ratio control in-phase state sections, two types of duty ratio control antiphase state sections, and a passive state section.

In one example, the pen information signal PINFO may indicates an N-digit symbol string, including N number of symbol values selected from among five symbol values, e.g., 0 to 4, at least one of which can be repeatedly selected. The five symbol values, e.g., 0 to 4, may correspond to the two types of duty ratio control in-phase state sections, the two types of duty ratio control antiphase state sections, and the passive state section.

Thus, the number of types of N-digit symbol strings that can be expressed using the pulses of the pen information signal PINFO may be $5^N$. The number of types of N-digit symbol strings may correspond to the number of types of pen information that can be expressed using the pen information signal PINFO.

Figure 22:
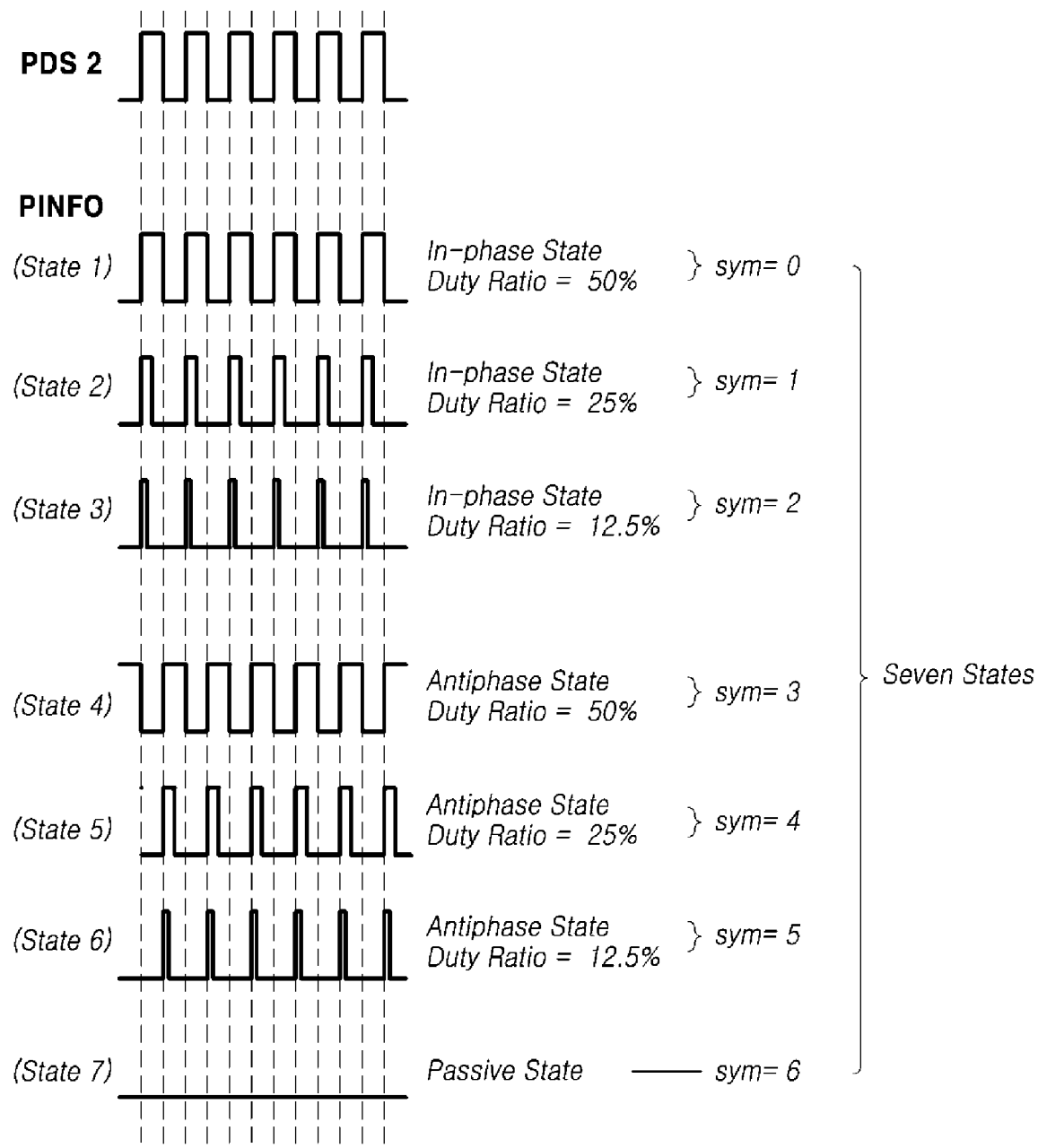
FIG. 22 illustrates seven types of state sections in a pen information signal in the touch system according to an example embodiment, in the case in which seven states and seven symbol values are used by subdivided duty ratio variable control to further increase the amount of pen information that the pen information signal can carry within a predetermined limited time.

FIG. 22 illustrates seven types of state sections in a pen information signal PINFO in the touch system according to an example embodiment, in which seven states, e.g., State 1, State 2, State 3, State 4, State 5, State 6, and State 7, and seven symbol values, e.g., 0, 1, 2, 3, 4, 5, and 6, are used by subdivided duty ratio variable control to further increase the amount of pen information that the pen information signal PINFO can carry within a predetermined limited time.

With reference to FIG. 22, an in-phase state section may include a first duty ratio control in-phase state section in which pulses have a first duty ratio 50%, a second duty ratio control in-phase state section in which pulses have a second duty ratio 25%, and a third duty ratio control in-phase state section in which pulses have a third duty ratio 12.5%. The first, second, and third duty ratios 50%, 25%, and 12.5% may be variously set.

With reference to FIG. 22, an antiphase state section may include a first duty ratio control antiphase state section in which pulses have a first duty ratio 50%, a second duty ratio control antiphase state section in which pulses have a second duty ratio 25%, and a third duty ratio control antiphase state section in which pulses have a third duty ratio 12.5%. The first, second, and third duty ratios 50%, 25%, and 12.5% may be variously set.

Thus, the pen information signal PINFO may include one or more state sections selected from among a total of seven state sections, including the first duty ratio control in-phase state section, the second duty ratio control in-phase state section, the third duty ratio control in-phase state section, the first duty ratio control antiphase state section, the second duty ratio control antiphase state section, the third duty ratio control antiphase state section, and a passive state section.

The first duty ratio control in-phase state section, the second duty ratio control in-phase state section, the third duty ratio control in-phase state section, the first duty ratio control antiphase state section, the second duty ratio control antiphase state section, the third duty ratio control antiphase state section, and the passive state section may correspond to different symbol values.

For example, the first duty ratio control in-phase state section expresses a first symbol value, e.g., 0, the second duty ratio control in-phase state section expresses a second symbol value 1, the third duty ratio control in-phase state section expresses a third symbol value, e.g., 2, the first duty ratio control antiphase state section expresses a fourth symbol value, e.g., 3, the second duty ratio control antiphase state section expresses a fifth symbol value, e.g., 4, the third duty ratio control antiphase state section expresses a sixth symbol value, e.g., 5, and the passive state section expresses a seventh symbol value, e.g., 6.

When the pen information signal PINFO may include pulses corresponding to an N-digit symbol string to express pen information, the pen information signal PINFO may include N number of signal sections selected from among seven types of state sections, at least one of which can be repeatedly selected. The seven types of state sections may include three types of duty ratio control in-phase state sections, three types of duty ratio control antiphase state sections, and a passive state section.

In one example, the pen information signal PINFO may indicate an N-digit symbol string, including N number of symbol values selected from among seven symbol values, e.g., 0 to 6, at least one of which can be repeatedly selected. The seven symbol values, e.g., 0 to 6, may correspond to the three types of duty ratio control in-phase state sections, the three types of duty ratio control antiphase state sections, and the passive state section.

Thus, the number of types of N-digit symbol strings that the pulses of the pen information signal PINFO express may be $7^N$. The number of types of N-digit symbol strings corresponds to the number of types of pen information that can be expressed using the pen information signal PINFO.

FIG. 23 illustrates (A+B+1) number of states and (A+B+1) number of symbol values generated by duty ratio variable control to further increase the amount of pen information that the pen information signal PINFO can carry within a predetermined limited time in the touch system according to an example embodiment.

With reference to FIG. 23, in a pen information signal PINFO, an in-phase state section may include one or more duty ratio control in-phase state sections among A number of duty ratio control in-phase state sections having different A number of duty ratios, DR_P_1, DR_P_2, and DR_P_A (where A≥2).

The A number of duty ratio control in-phase state sections may include pulses corresponding to A number of states, e.g., State 1, State 2, . . . , and State A. A number of duty ratios, DR_P_1, DR_P_2, . . . , and DR_P_A, may be set to have a variety of values. A number of symbol values of the A number of duty ratio control in-phase state sections may be variously set to have different values, for example, 0, 1, . . . , and (A−1).

In the pen information signal PINFO, an antiphase state section may include one or more duty ratio control antiphase state sections among B number of duty ratio control antiphase state sections having different B number of duty ratios, DR_P_1, DR_P_2, . . . , and DR_P_B (where B≤2). The B number of duty ratio control antiphase state sections may include pulses corresponding to B number of states, e.g., State (A+1), State (A+2), . . . , and State (A+B).

B number of duty ratios, DR_P_1, DR_P_2, . . . , and DR_P_B, may be set to have a variety of values. B number of symbol values of the B number of duty ratio control antiphase state sections may be variously set to be different values, for example, A, (A+1), . . . , and (A+B−1).

The pen information signal PINFO may include a passive state section. The passive state section may be one or more sections selected from among, for example, a ground voltage section GND having a ground voltage, a DC voltage section DC having a specific DC voltage except for the ground voltage, a floating section FLOAT in which the signal may be interrupted because no voltage or signal may be output from the active pen 20, and a pulse section OFF_PULSE including pulses distinguishable from the pulses in the in-phase section and the antiphase section. Symbol values in the passive state section may be set differently to the other symbol values, e.g., 0, 1, . . . , (A−1), A, (A+1), . . . , and (A+B−1), and may be set to be, for example, (A+B).

In the present disclosure, it has been described that there may be a single passive state section and a single symbol value corresponding to the passive state section. In some examples, however, the passive state section may be subdivided into two or more subsections, like the in-phase state section and the antiphase state section. In one example, the passive state section may be expressed by two or more symbol values.

The A number of duty ratio control in-phase state sections, the B number of duty ratio control antiphase state sections, and the passive state section may indicate different symbol values, e.g., 0, 1, . . . , (A−1), A, (A+1), . . . , (A+B−1), and (A+B). The pen information signal PINFO may include N number of signal sections selected from among (A+B+1) number of state sections State 1, State 2, . . . , State A, State (A+1), . . . , State (A+B), and State (A+B+1), at least one of which can be repeatedly selected. The (A+B+1) number of state sections may include the A number of duty ratio control in-phase state sections, the B number of duty ratio control antiphase state sections, and the passive state section.

The pen information signal PINFO may indicate an N-digit symbol string including N number of symbol values selected from among (A+B+1) number of symbol values, e.g., 0, 1, . . . , (A−1), A, (A+1), . . . , (A+B−1), and (A+B), at least one of which can be repeatedly selected. The (A+B+1) number of symbol values may correspond to the A number of duty ratio control in-phase state sections, the B number of duty ratio control antiphase state sections, and the passive state section.

An N-digit symbol string indicated by the pulses of the pen information signal PINFO may express pen information regarding the active pen 20. The number of types of N-digit symbol strings may be $(A+B+1)^N$. The number of types of N-digit symbol strings may correspond to the number of types of pen information that can be expressed using the pen information signal PINFO.

As described above, it may be possible to diversify the pulse states in the pen information signal PINFO by duty ratio variable control to the pen information signal PINFO, thereby further increasing the amount of pen information that the pen information signal PINFO can carry within a predetermined limited time.

Figure 24:
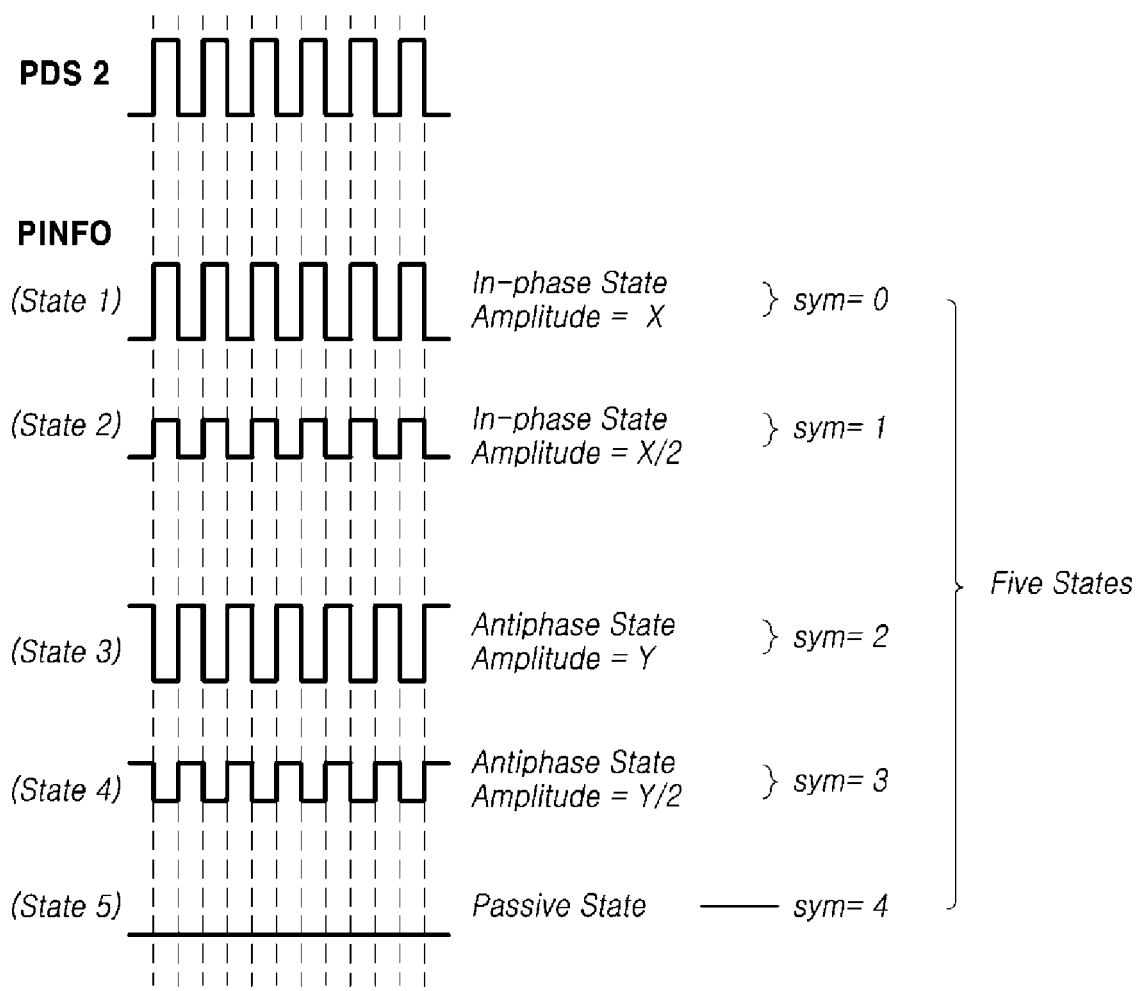
FIG. 24 illustrates five types of state sections in a pen information signal in the touch system according to an example embodiment, in the case in which five states and five symbol values are used by amplitude variable control to further increase the amount of pen information that the pen information signal can carry within a predetermined limited time.

FIG. 24 illustrates five types of state sections in a pen information signal PINFO in the touch system according to an example embodiment, in which five states, e.g., State 1, State 2, State 3, State 4, and State 5, and five symbol values, e.g., 0, 1, 2, 3, and 4, may be used by amplitude variable control to further increase the amount of pen information that the pen information signal PINFO can carry within a predetermined limited time.

With reference to FIG. 24, an in-phase state section may include a first amplitude control in-phase state section in which pulses have a first amplitude (an X voltage) and a second amplitude control in-phase state section in which pulses have a second amplitude (an X/2 voltage).

With reference to FIG. 24, an antiphase state section may include a first amplitude control antiphase state section in which pulses have a first amplitude (a Y voltage) and a second amplitude control antiphase state section in which pulses have a second amplitude (a Y/2 voltage). The Y voltage may be the same as or different from the X voltage.

Thus, the pen information signal PINFO may include one or more state sections selected from among a total of five state sections, including the first amplitude control in-phase state section, the second amplitude control in-phase state section, the first amplitude control antiphase state section, the second amplitude control antiphase state section, and a passive state section. The first amplitude control in-phase state section, the second amplitude control in-phase state section, the first amplitude control antiphase state section, the second amplitude control antiphase state section, and the passive state section may correspond to different symbol values.

For example, the first amplitude control in-phase state section may indicate a first symbol value, e.g., 0, the second amplitude control in-phase state section may indicate a second symbol value, e.g., 1, the first amplitude control antiphase state section may indicate a third symbol value, e.g., 2, the second amplitude control antiphase state section may indicate a fourth symbol value, e.g., 3, and the passive state section may indicate a fifth symbol value, e.g., 4.

When the pen information signal PINFO includes pulses corresponding to an N-digit symbol string to express pen information, the pen information signal PINFO may include N number of signal sections selected from among five types of state sections, at least one of which can be repeatedly selected. The five types of state sections may include two types of amplitude control in-phase state sections, two types of amplitude control antiphase state sections, and a passive state section.

In one example, the pen information signal PINFO may indicates an N-digit symbol string including N number of symbol values selected from among five symbol values, e.g., 0 to 4, at least one of which can be repeatedly selected. The five symbol values, e.g., 0 to 4, may correspond to the two types of amplitude control in-phase state sections, the two types of amplitude control antiphase state sections, and the passive state section.

Thus, the number of types of N-digit symbol strings that can be expressed using the pulses of the pen information signal PINFO may be $5^N$. The number of types of N-digit symbol strings may correspond to the number of types of pen information that can be expressed using the pen information signal PINFO.

Figure 25:
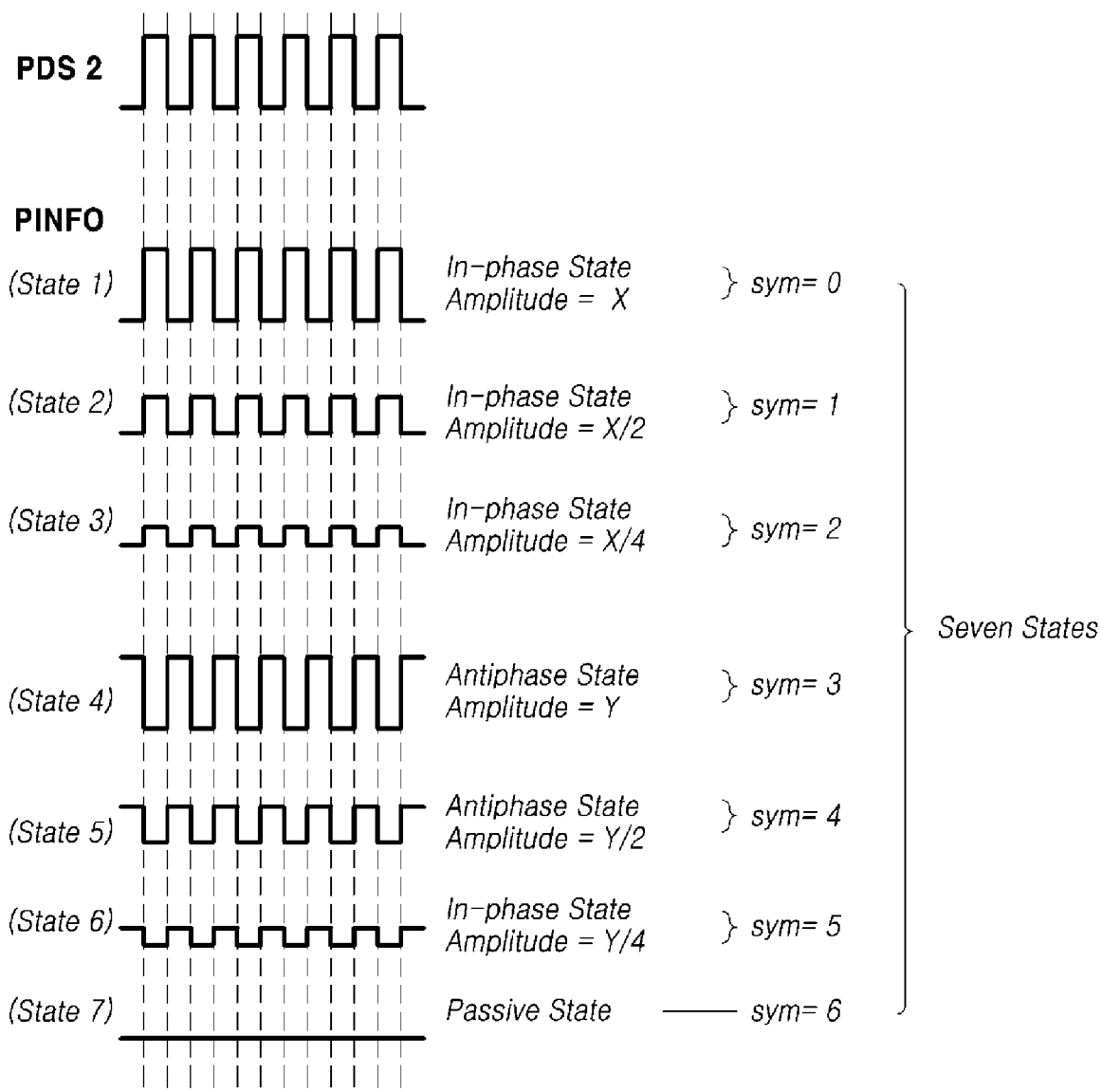
FIG. 25 illustrates seven types of state sections in a pen information signal in the touch system according to an example embodiment, in the case in which seven states and seven symbol values are used by subdivided amplitude variable control to further increase the amount of pen information that the pen information signal can carry within a predetermined limited time.

FIG. 25 illustrates seven types of state sections in a pen information signal PINFO in the touch system according to an example embodiment, in which seven states, e.g., State 1, State 2, State 3, State 4, State 5, State 6, and State 7, and seven symbol values, e.g., 0, 1, 2, 3, 4, 5, and 6, are used by subdivided amplitude variable control to further increase the amount of pen information that the pen information signal PINFO can carry within a predetermined limited time.

With reference to FIG. 25, an in-phase state section may include a first amplitude control in-phase state section in which pulses have a first amplitude (an X voltage), a second amplitude control in-phase state section in which pulses have a second amplitude (an X/2 voltage), and a third amplitude control in-phase state section in which pulses have a third amplitude (an X/4 voltage). The first to third amplitudes (the X, X/2, and X/4 voltages) may be variously set.

With reference to FIG. 25, an antiphase state section may include a first amplitude control antiphase state section in which pulses have a first amplitude (a Y voltage), a second amplitude control antiphase state section in which pulses have a second amplitude (a Y/2 voltage), and a third amplitude control antiphase state section in which pulses have a third amplitude (a Y/4 voltage). The first to third amplitudes (the Y, Y/2, and Y/4 voltages) may be variously set. The Y voltage may be the same as or different from the X voltage.

Thus, the pen information signal PINFO may include one or more state sections selected from among a total of seven state sections, including the first amplitude control in-phase state section, the second amplitude control in-phase state section, the third amplitude control in-phase state section, the first amplitude control antiphase state section, the second amplitude control antiphase state section, the third amplitude control antiphase state section, and a passive state section.

In the first amplitude control in-phase state section, the second amplitude control in-phase state section, the third amplitude control in-phase state section, the first amplitude control antiphase state section, the second amplitude control antiphase state section, the third amplitude control antiphase state section, and the passive state section, different symbol values may be expressed. For example, the first amplitude control in-phase state section may express a first symbol value, e.g., 0, the second amplitude control in-phase state section may express a second symbol value, e.g., 1, the third amplitude control in-phase state section may express a third symbol value, e.g., 2, the first amplitude control antiphase state section may express a fourth symbol value, e.g., 3, the second amplitude control antiphase state section may express a fifth symbol value, e.g., 4, the third amplitude control antiphase state section may express a sixth symbol value, e.g., 5, and the passive state section expresses a seventh symbol value, e.g., 6.

When the pen information signal PINFO includes pulses corresponding to an N-digit symbol string to express pen information, the pen information signal PINFO may include N number of signal sections selected from among seven types of state sections, at least one of which can be repeatedly selected. The seven types of state sections may include three types of amplitude control in-phase state sections, three types of amplitude control antiphase state sections, and a passive state section.

In one example, the pen information signal PINFO may indicate an N-digit symbol string including N number of symbol values selected from among seven symbol values, e.g., 0 to 6, at least one of which can be repeatedly selected. The seven symbol values, e.g., 0 to 6, may correspond to the three types of amplitude control in-phase state sections, the three types of amplitude control antiphase state sections, and the passive state section.

Thus, the number of types of N-digit symbol strings that the pulses of the pen information signal PINFO express may be $7^N$. The number of types of N-digit symbol strings may correspond to the number of types of pen information that can be expressed using the pen information signal PINFO.

FIG. 26 illustrates (C+D+1) number of states and (C+D+1) number of symbol values generated by amplitude variable control to further increase the amount of pen information that the pen information signal PINFO can carry within a predetermined limited time in the touch system according to an example embodiment.

With reference to FIG. 26, in a pen information signal PINFO, an in-phase state section may include one or more amplitude control in-phase state sections among C number of amplitude control in-phase state sections having different C number of amplitudes, AMP_P_1, AMP_P_2, . . . , and AMP_P_C (where C≥2).

The C number of amplitude control in-phase state sections may include pulses corresponding to C number of states, e.g., State 1, State 2, . . . , and State C. C number of amplitudes, AMP_P_1, AMP_P_2, . . . , and AMP_P_C, may be set to have a variety of values. C number of symbol values of the C number of amplitude control in-phase state sections may be variously set to have different values, for example, 0, 1, . . . , and (C−1).

In the pen information signal PINFO, an antiphase state section may include one or more amplitude control antiphase state sections among D number of amplitude control antiphase state sections having different D number of amplitudes, AMP_R_1, AMP_R_2, . . . , and AMP_R_D (where D≥2).

The D number of amplitude control antiphase state sections may include pulses corresponding to D number of states, e.g., State (C+1), State (C+2), . . . , and State (C+D). D number of amplitudes, AMP_R_1, AMP_R_2, . . . , and AMP_R_D, may be set to have a variety of values. D number of symbol values of the D number of amplitude control antiphase state sections may be variously set to be different values, for example, C, (C+1), . . . , and (C+D−1).

The pen information signal PINFO may include a passive state section. The passive state section may be one or more sections selected from among, for example, a ground voltage section GND having a ground voltage, a DC voltage section DC having a specific DC voltage except for the ground voltage, a floating section FLOAT in which the signal may be interrupted because no voltage or signal may be output from the active pen 20, and a pulse section OFF_PULSE including pulses distinguishable from the pulses in the in-phase section and the antiphase section.

Symbol values in the passive state section may be set differently to the other symbol values, e.g., 0, 1, . . . , (C−1), C, (C+1), . . . , and (C+D−1), and may be set to be, for example, (C+D). The C number of amplitude control in-phase state sections, the D number of amplitude control antiphase state sections, and the passive state section may indicate different symbol values, e.g., 0, 1, . . . , (C−1), C, (C+1), (C+D−1), and (C+D).

The pen information signal PINFO may include N number of signal sections selected from among (C+D+1) number of state sections, e.g., State 1, State 2, . . . , State C, State (C+1), . . . , State (C+D), and State (C+D+1), at least one of which can be repeatedly selected. The (C+D+1) number of state sections may include the C number of amplitude control in-phase state sections, the D number of amplitude control antiphase state sections, and the passive state section.

The pen information signal PINFO may indicate an N-digit symbol string including N number of symbol values selected from among (C+D+1) number of symbol values, e.g., 0, 1, . . . , (C−1), C, (C+1), . . . , (C+D−1), and (C+D), at least one of which can be repeatedly selected. The (C+D+1) number of symbol values may correspond to the C number of amplitude control in-phase state sections, the D number of amplitude control antiphase state sections, and the passive state section.

An N-digit symbol string indicated by the pulses of the pen information signal PINFO may express pen information regarding the active pen 20. The number of types of N-digit symbol strings may be $(C+D+1)^N$. The number of types of N-digit symbol strings may correspond to the number of types of pen information that can be expressed using the pen information signal PINFO.

As described above, it may be possible to diversify the pulse states in the pen information signal PINFO by amplitude variable control to the pen information signal PINFO, thereby further increasing the amount of pen information that the pen information signal PINFO can carry within a predetermined limited time.

The duty ratio variable control and the amplitude variable control, as described above, can be performed simultaneously. Thus, the duty ratio and the amplitude of pulses in the pen information signal PINFO may be varied. Because both the duty ratio and the amplitude of pulses in the pen information signal PINFO may be varied as described, pulse states in the pen information signal PINFO can be further diversified, thereby further increasing the amount of pen information that the pen information signal PINFO can carry within a predetermined limited time.

Figure 27:
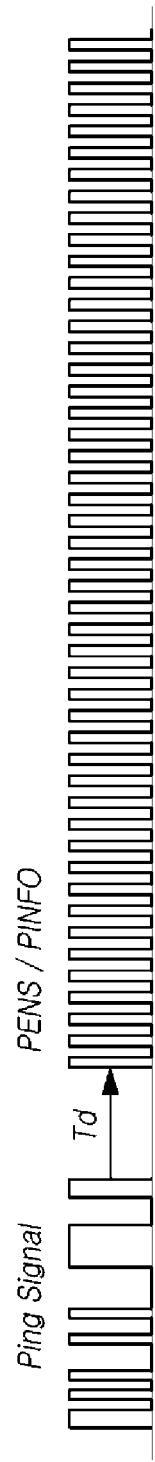
FIG. 27 illustrates a Ping signal for signal synchronization in the touch system according to an example embodiment.

FIG. 27 illustrates a Ping signal for signal synchronization in the touch system according to an example embodiment.

In the remaining LHB, except for the LHB corresponding to the beacon signal transmission period BCON, a Ping signal, e.g., a panel driving signal having a special use, can be transferred to the touchscreen panel TSP. For a predetermined period of time in each of the remaining LHBs (or a predetermined period of time in the first half of each of the remaining LHBs) except for the LHB corresponding to the beacon signal transmission period BCON, a panel driving signal for driving the touchscreen panel TSP and the Ping signal having a special use for synchronization of a pen signal (or a pen driving signal) output from the active pen 20 may be transferred to the touchscreen panel TSP, and the active pen 20 can perform signal synchronization by receiving the Ping signal through the touchscreen panel TSP.

During a first half period set to each of two or more LHBs in which a pen signal PENS or PINFO may be output from at least one active pen 20, the touch circuit 300 may transfer a Ping signal including pulses indicating predetermined codes to the touchscreen panel TSP, and the at least one active pen 20 may receive the Ping signal through the pen tip thereof.

The Ping signal may be a signal synchronizing the touchscreen panel TSP and the active pen. Based on the received Ping signal, the active pen 20 can output the pen signal PENS or PINFO, synchronized with the panel driving signal transferred to the touchscreen panel TSP or an internal operation signal of the touch circuit 300.

For example, the active pen 20 may generate the pen signal PENS or PINFO synchronized with the driving frequency of the touchscreen panel TSP, in response to the Ping signal. After a predetermined time Td has elapsed from the last pulse among the pulses of the Ping signal PNG, the pen signal PENS or PINFO can be output from the active pen 20.

Figure 28:
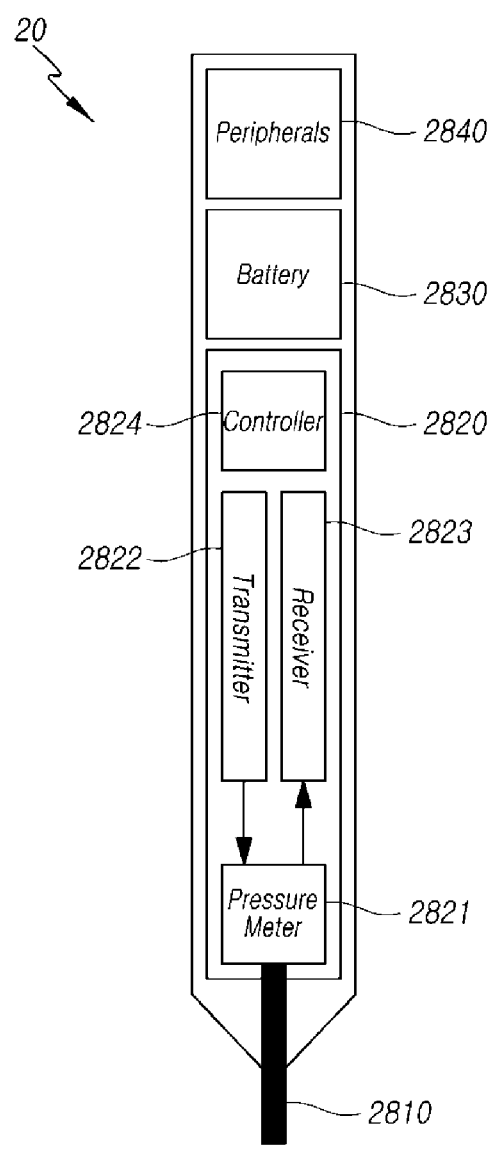
FIG. 28 is a diagram illustrating the active pen according to the example embodiments.
Figure 29:
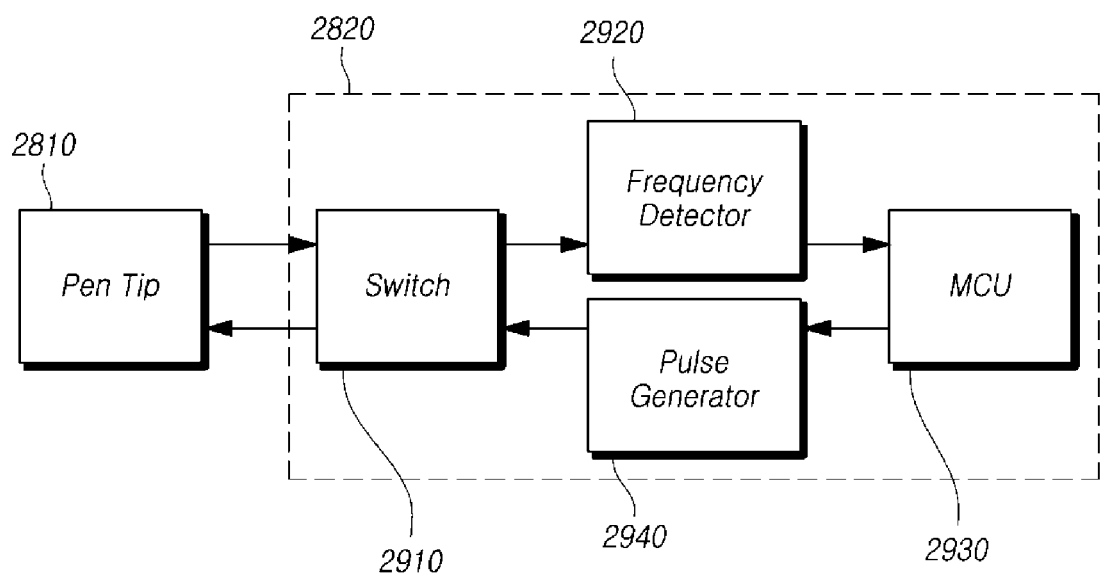
FIG. 29 is a diagram illustrating signal transmission and reception of the active pen according to the example embodiments.

FIG. 28 is a diagram illustrating the active pen according to the example embodiments. FIG. 29 is a diagram illustrating signal transmission and reception of the active pen according to the example embodiments.

With reference to FIG. 28, the active pen 20, working in concert with the touch display device 10, may include a pen tip portion 2810 and a processing portion (or processor) 2820. The pen tip portion 2810 may include at least one pen tip that may be brought into contact with or adjacently to the touchscreen panel TSP of the touch display device 10. The processor 2820 may receive a panel driving signal transferred to the touchscreen panel TSP through the pen tip portion 2810, and in response to the panel driving signal, may output a variety of pen signals through the pen tip portion 2810. The active pen 20 may further include a battery 2830 and other peripherals 2840, such as a button, a communications module (e.g., a Bluetooth module), an indicator, and the like.

The processor 2820 may include a pressure meter 2821 for sensing a pressure (or a pen pressure) applied to the pen tip portion 2810, a receiver 2823 for sensing the frequency of an electric field (e.g., a panel driving signal) received from the pen tip portion 2810, a transmitter 2822 for outputting a synchronized signal to the touchscreen panel TSP, a controller 2824 for performing controls related to the operation of the active pen 20, and the like. The pressure meter 2821 may be implemented as, for example, a pressure sensor (e.g., a microelectromechanical system (MEMS)), an amplifier (Amp), or the like.

The controller 2824 may determine a panel ID of the touchscreen panel TSP based on the signal received from the receiver 2823, may generate a communications protocol in accordance with the determined panel ID, may control the timing of the transmitter 2822, may receive information regarding a pressure signal from the pressure meter 2821, may edit information regarding the pressure signal, and may control other button signals. The controller 2824 may be implemented as a micro control unit (MCU) 2930.

With reference to FIG. 29, the processor 2820 may further include a switch 2910 for performing a switching operation together with the pen tip portion 2810, a frequency detector 2920 for sensing the frequency of an electric field (or a panel driving signal) received through the touchscreen panel TSP, a pulse generator 2940 for generating pulses corresponding to a variety of pen signals, e.g., PENS and PINFO, and the like.

The frequency detector 2920 may be implemented as, for example, a comparator, and may further include an amplifier. The pulse generator 2940 may include an amplifier. The MCU 2930 can select a protocol in response to a beacon signal, and can control the pulse generation timing of the pulse generator 2940 in response to the beacon signal or the Ping signal.

In the active pen 20, the pen tip portion 2810 may include at least one pen tip, as a portion for receiving or transmitting an electric field. When the pen tip portion 2810 includes two or more pen tips, the two or more pen tips may be spaced apart from each other at a predetermined distance. Values of the distance between the two or more pen tips can be carried, by the pen information signal PINFO or the like, to the touch display device 10.

The distance between the two or more pen tips may be used to calculate the tilt (or incline) of the active pen 20. Thus, the distance between the two or more pen tips may be intentionally designed so that the tilt of the pen can be calculated.

During the pen information recognition period DATA, the processor 2820 can receive a second panel driving signal PDS2 through the pen tip portion 2810 including at least one pen tip, and in response to the second panel driving signal PDS2, may output a pen information signal PINFO through the at least one pen tip. Each of the second panel driving signal PDS2 and the pen information signal PINFO may include a plurality of pulses.

The pen information signal PINFO, output from the processor 2820, may include one or more sections selected from among an in-phase state section including pulses in phase with the pulses of the second panel driving signal PDS2, an antiphase state section including pulses having a different phase from the pulses of the second panel driving signal PDS2, and a passive state section. The passive state section may be selected from among a ground voltage section, a DC voltage section, a floating section, and a pulse section including pulses distinguishable from the pulses in the in-phase state section and the antiphase state section. As described above, the active pen 20 can send the pen information signal PINFO having a greater amount of pen information to the touch display device 10 within a predetermined limited time.

Figure 30:
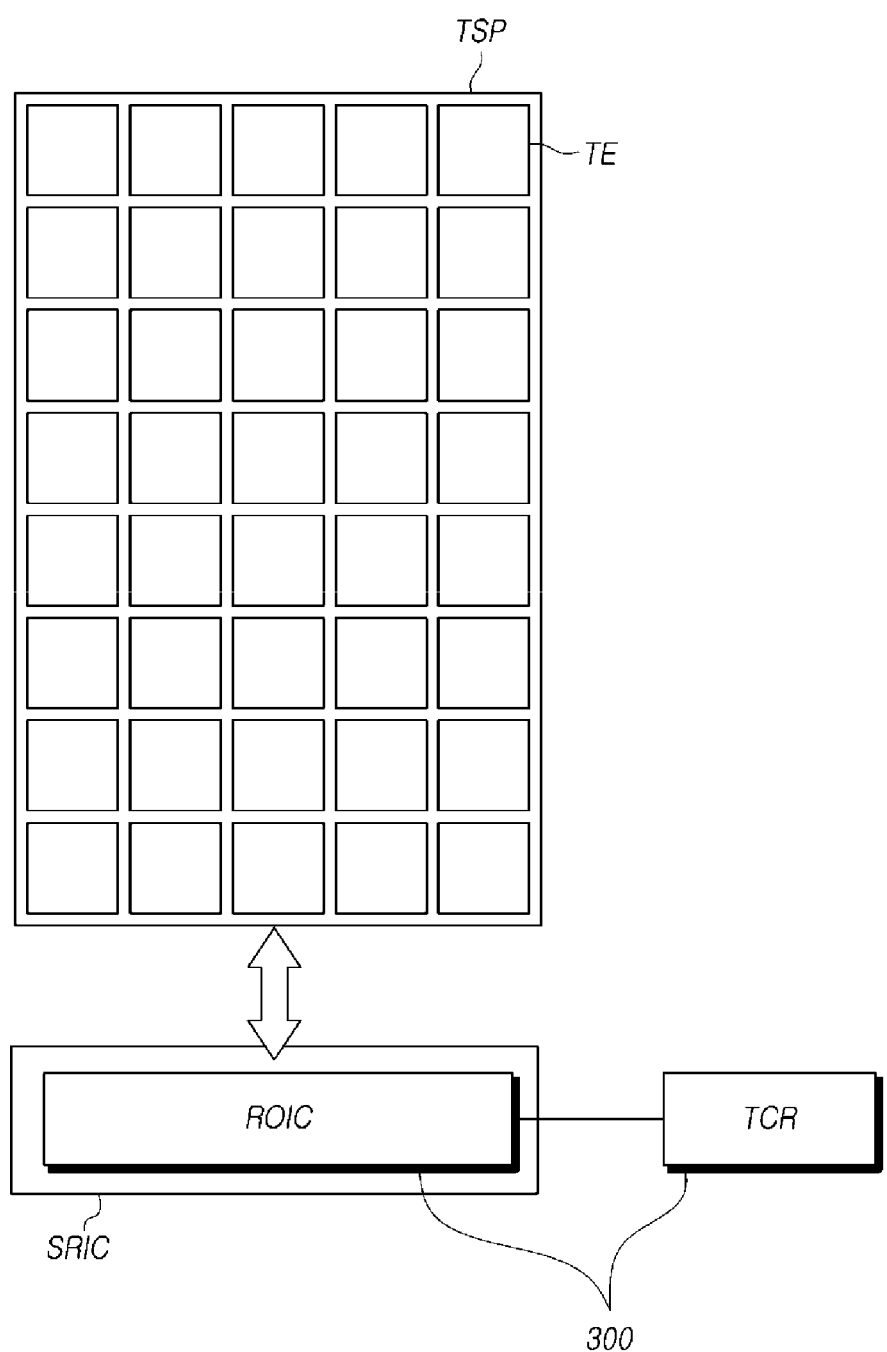
FIG. 30 is a diagram illustrating the touch circuit according to an example embodiment.

FIG. 30 is a diagram illustrating the touch circuit according to an example embodiment.

With reference to FIG. 30, the touch circuit 300 according to an example embodiment may include one or more first circuits ROIC, a second circuit TCR, and the like. The one or more first circuits ROIC may output a panel driving signal to the touchscreen panel TSP, may receive a pen signal PENS or PINFO, output from the active pen 20 in response to the panel driving signal, through the touchscreen panel TSP, and may output a digital value corresponding to the received pen signal PENS or PINFO. The second circuit TCR may receive a digital value regarding the pen signal PENS or PINFO, and, based on the digital value, may sense a touch input performed by the active pen 20 or pen information regarding the active pen 20.

The one or more first circuits ROIC of the touch circuit 300 may be embodied as a single component or individual components. The one or more first circuits ROIC of the touch circuit 300 and the one or more SDICs of the data driver circuit 120 may be integrated as one or more combined ICs SRIC. That is, each of the combined ICs SRIC may include a first circuit ROIC and an SDIC. In addition, the one or more first circuits ROIC and the second circuit TCR of the touch circuit 300 may be integrated as a single component.

With regard to finger touch sensing, the first circuit ROIC can output a third panel driving signal PDS3 to the touchscreen panel TSP, and may receive a touch sensing signal SENS through the touchscreen panel TSP. The second circuit TCR can sense the position of a touch input performed by the finger or a normal pen, based on the touch sensing signal SENS.

With regard to pen position/tilt sensing, the first circuit ROIC can output a first panel driving signal PDS1 to the touchscreen panel TSP, and may receive a pen signal PENS, output from the active pen 20 in response to the first panel driving signal PDS1, through the touchscreen panel TSP. The second circuit TCR can sense the position of a touch input performed by the active pen 20 or the tilt of the active pen 20 based on the pen signal PENS.

With regard to pen information recognition, the first circuit ROIC can output a second panel driving signal PDS2 to the touchscreen panel TSP, and may receive a pen information signal PINFO, output from the active pen 20 in response to the second panel driving signal PDS2, through the touchscreen panel TSP. The second circuit TCR can recognize pen information regarding the active pen 20, based on the pen information signal PINFO.

Each of the second panel driving signal PDS2 and the pen information signal PINFO may include pulses. The pen information signal PINFO received by the first circuit ROIC may include one or more sections selected from among an in-phase state section including pulses in phase with the pulses of the second panel driving signal PDS2, an antiphase state section including pulses having a different phase from the pulses of the second panel driving signal PDS2, and a passive state section. The passive state section may be selected from among a ground voltage section, a DC voltage section, a floating section, and a pulse section including pulses distinguishable from the pulses in the in-phase state section and the antiphase state section. As described above, the touch circuit 300 can receive the pen information signal PINFO carrying a greater amount of pen information, thereby more rapidly recognizing a greater amount of pen information regarding the active pen 20 within a predetermined limited time.

Figure 31:
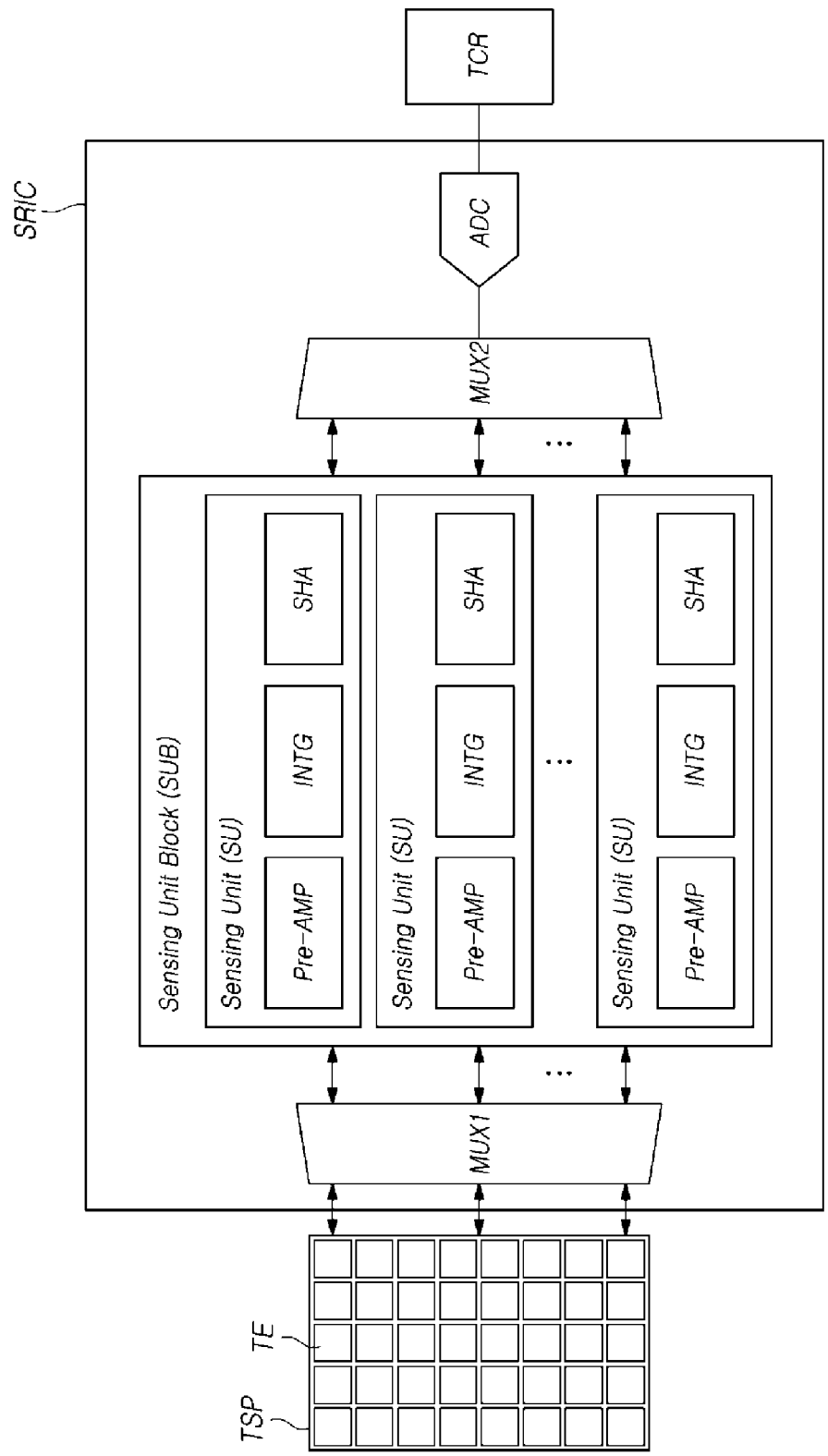
FIG. 31 illustrates the configuration of an internal circuit of the first circuit of the touch circuit according to an example embodiment.

FIG. 31 illustrates the configuration of an internal circuit of the first circuit of the touch circuit according to an example embodiment.

With reference to FIG. 31, the first circuit ROIC may be included in the combined circuit SRIC. The first circuit ROIC may include a first multiplexer circuit MUX1, a sensing unit block SUB including a plurality of sensing units SU, a second multiplexer circuit MUX2, an analog-to-digital converter ADC, and the like.

Each of the sensing units SU may include a pre-amplifier Pre-AMP, an integrator INTG, a sample and hold circuit SHA, and the like. A single sample and hold circuit SHA may be included in each of the sensing units SU. Alternatively, a single sample and hold circuit SHA may be provided in every two or more sensing units SU. In some embodiments, a single sample and hold circuit SHA may be provided for the entirety of the plurality of sensing units SU.

Panel driving signals, such as a beacon signal, a Ping signal, PDS1, PDS2, PDS3, and the like, having a variety of uses, can be delivered to corresponding touch electrodes TE through the pre-amplifier Pre-AMP and the first multiplexer circuit MUX1, and then, through corresponding signal lines SL in the touchscreen panel TSP.

The first multiplexer circuit MUX1 may select one of a variety of signals, such as PENS, PINFO, SENS, and the like, received from the touchscreen panel TSP. The selected signal may be delivered to a corresponding sensing unit SU in the sensing unit block SUB before being input to the integrator INTG through the pre-amplifier Pre-AMP.

The integrator INTG may output an integrated value of an output voltage from the pre-amplifier Pre-AMP (e.g., a signal output from an output terminal of the pre-amplifier Pre-AMP). The integrator INTG may include elements, such as a comparator, a capacitor, and the like. The signal output from the integrator INTG may be input to the sample and hold circuit SHA.

The sample and hold circuit SHA may be a circuit attached to an input terminal of the analog-to-digital converter ADC. The sample and hold circuit SHA may sample an input voltage, and may maintain the input voltage until the analog-to-digital converter ADC completes a previous conversion.

The second multiplexer circuit MUX2 may select one sensing unit among the plurality of sensing units SU, and may input a voltage, maintained by the sample and hold circuit SHA of the selected sensing unit, to the analog-to-digital converter ADC. The analog-to-digital converter ADC may convert the input voltage into a digital value, and may output a sensing value corresponding to the converted digital value. The output sensing value may be used in the second circuit TCR to detect a touch and/or a touched position performed by the finger, to detect a touch and/or a touched position performed by the active pen 20, or to recognize pen information regarding the active pen 20.

As described above, the panel driving signals, such as a beacon signal, a Ping signal, PDS1, PDS2, PDS3, and the like, can be transferred to the touchscreen panel TSP through the pre-amplifier Pre-AMP in the first circuit ROIC. The panel driving signals, such as a beacon signal, a Ping signal, PDS1, PDS2, PDS3, and the like, can be transferred to the touchscreen panel TSP using a different method.

Figure 32:
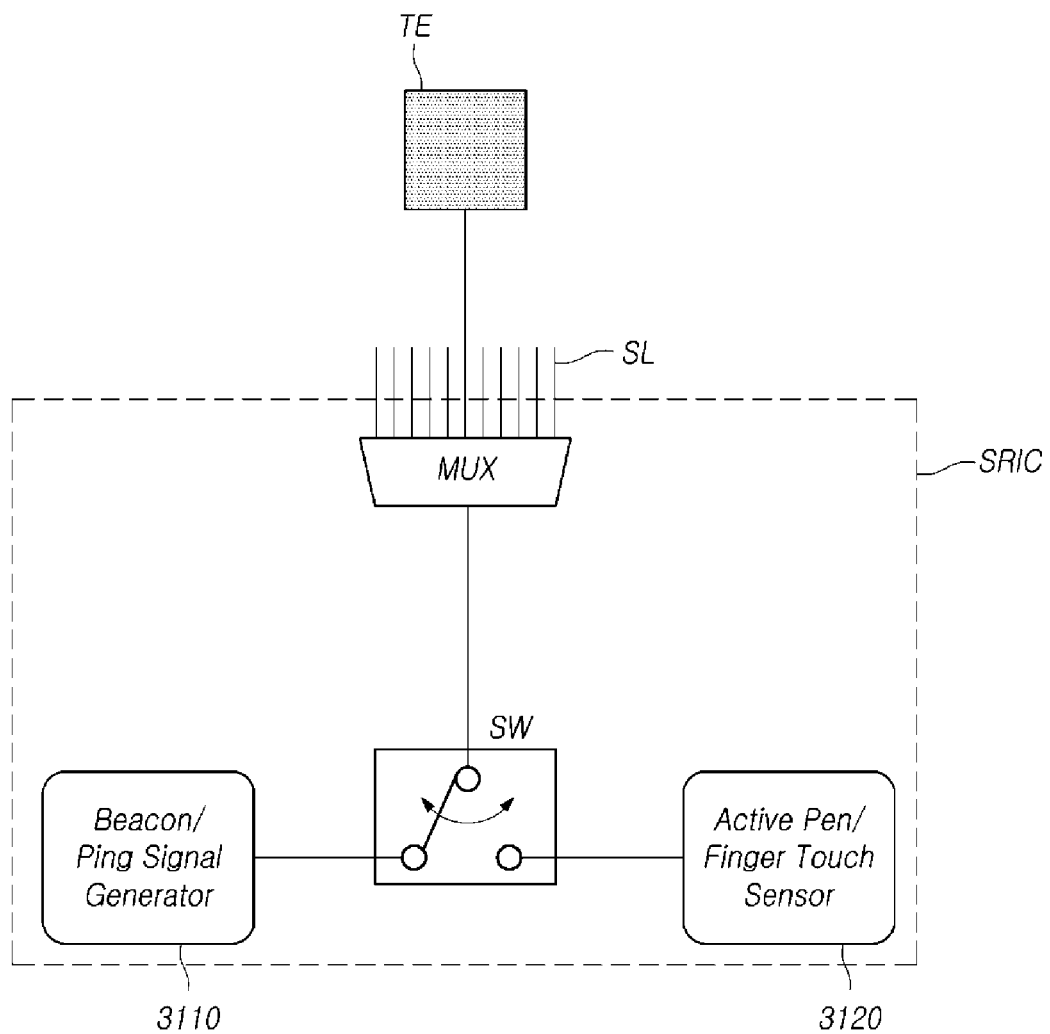
FIG. 32 illustrates a circuit structure for transferring panel driving signals to the touchscreen panel in the touch system according to an example embodiment.

FIG. 32 illustrates a circuit structure for transferring panel driving signals to the touchscreen panel in the touch system according to an example embodiment.

For sensing a touch performed by the finger or the like and sensing a pen touch performed by the active pen 20, a plurality of types of panel driving signals, such as a beacon signal, a Ping signal, PDS1, PDS2, PDS3, and the like, may be transferred to the touchscreen panel TSP in accordance with the driving timing. The beacon signal and the Ping signal may be signals respectively including pulses indicating predetermined codes, having a high level and a low level. However, the beacon signal and the pin signal may not repeatedly swing between the high level and the low level. In contrast, each of the first to third panel driving signals PDS1, PDS2, and PDS3 may not be pulses indicating predetermined codes, but may be a simple pulse signal repeatedly swinging between a high level and a low level.

In this regard, the combined circuit SRIC may include a beacon/Ping signal generator 3110 for generating a beacon signal and a Ping signal, an active pen/finger touch sensor 3120 for outputting first to third panel driving signals PDS1, PDS2, and PDS3, and a switch SW for electrically connecting one of the beacon/Ping signal generator 3110 and the active pen/finger touch sensor 3120 to a multiplexer circuit MUX (that can be the first multiplexer circuit MUX1 in FIG. 31), in addition to the first circuit ROIC.

The first to third panel driving signals PDS1, PDS2, and PDS3 may be the same signals. At least one of the first to third panel driving signals PDS1, PDS2, and PDS3 may be a different signal. In one example, at least one of the first to third panel driving signals PDS1, PDS2, and PDS3 may have a different frequency. In another example, at least one of the first to third panel driving signals PDS1, PDS2, and PDS3 may have a different amplitude.

A pen recognition method as described above will be described briefly with reference to FIG. 33.

Figure 33:
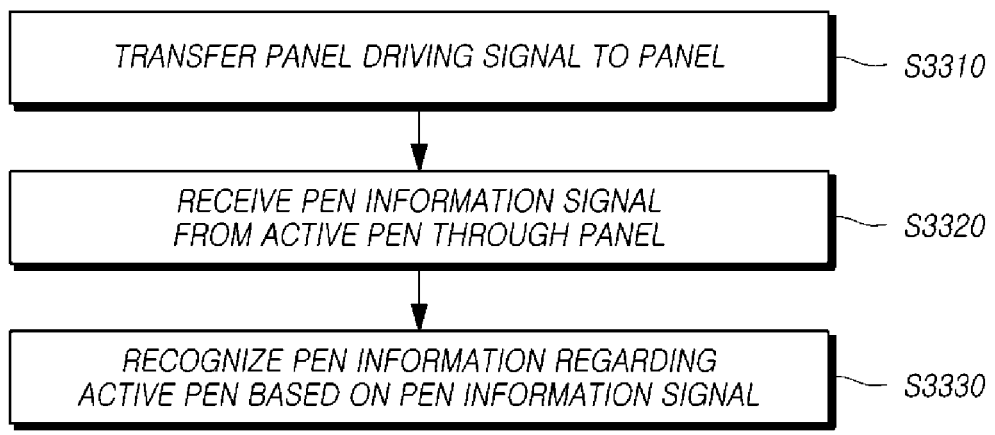
FIG. 33 is a flowchart illustrating a pen recognition method according to an example embodiment.

FIG. 33 is a flowchart illustrating a pen recognition method according to an example embodiment.

With reference to FIG. 33, the pen recognition method according to an example embodiment may include: operation S3310 for transferring a second panel driving signal PDS2 to the touchscreen panel TSP; operation S3320 for receiving a pen information signal PINFO, output from the active pen 20 adjacent to the touchscreen panel TSP in response to the second panel driving signal PDS2, through the touchscreen panel TSP; and operation S3330 for recognizing the pen information regarding the active pen 20 based on the pen information signal PINFO. Each of the second panel driving signal PDS2 and the pen information signal PINFO may include a plurality of pulses. The second panel driving signal PDS2 and the pen information signal PINFO may have the same frequency.

The pen information signal PINFO may include one or more sections selected from among an in-phase state section including pulses in phase with the pulses of the second panel driving signal PDS2, an antiphase state section including pulses having a different phase from the pulses of the second panel driving signal PDS2, and a passive state section. The passive state may be selected from among a ground voltage section, a DC voltage section, a floating section, and a pulse section including pulses distinguishable from the pulses in the in-phase state section and the antiphase state section.

The use of the above-described pen recognition method can further increase the amount of pen information that the pen information signal PINFO can carry within a predetermined limited time, so the touch display device 10 can more rapidly and accurately recognize a large amount of pen information regarding the active pen 20.

As described above, pulse states in the pen information signal PINFO can be diversified. Accordingly, the phase, duty ratio, and amplitude in the pen information signal PINFO may be used to further increase the amount of pen information that the pen information signal PINFO can carry within a predetermined limited time.

This method will be summarized briefly with respect to the touch display device 10, the touch circuit 300, and the active pen 20. The touch display device 10 according to an example embodiment may include the touchscreen panel TSP and the touch circuit 300. The touchscreen panel TSP may be provided with the plurality of touch electrodes TE. The touch circuit 300 may transfer a second panel driving signal PDS2 to the touchscreen panel TSP, may receive a pen information signal PINFO, output from the active pen 20 in response to the second panel driving signal PDS2, through the touchscreen panel TSP, and may recognize pen information regarding the active pen 20 based on the pen information signal PINFO.

Each of the second panel driving signal PDS2 and the pen information signal PINFO may include a plurality of pulses. The pen information signal PINFO may have a pulse section in which at least one of the phase, duty ratio, and amplitude of the pen information signal PINFO may be varied. The touch circuit 300 can recognize pen information regarding the active pen 20 based on at least one of the phase, duty ratio, and amplitude of the pen information signal PINFO.

The active pen 20 according to an example embodiment may include the pen tip portion 2810 and the processor 2820. The pen tip portion 2810 may include at least one pen tip that may be brought into contact with or adjacently to the touchscreen panel TSP of the touch display device 10. The processor 2820 may receive a panel driving signal transferred to the touchscreen panel TSP through the at least one pen tip, and in response to the panel driving signal, may output a variety of pen signals through the at least one pen tip.

Each of the second panel driving signal PDS2 and the pen information signal PINFO may include a plurality of pulses. The pen information signal PINFO may have a pulse section in which at least one of the phase, duty ratio, and amplitude of the pen information signal PINFO may be varied. The pen information can be expressed by at least one of the phase, duty ratio, and amplitude of the pen information signal PINFO.

The touch circuit 300 according to an example embodiment may include the first circuit ROIC and the second circuit TCR. The first circuit ROIC may output a second panel driving signal PDS2 to the touchscreen panel TSP, and may receive a pen information signal PINFO, output from the active pen 20 in response to the second panel driving signal PDS2, through the touchscreen panel TSP. The second circuit TCR may recognize pen information regarding the active pen 20 based on the pen information signal PINFO.

Each of the second panel driving signal PDS2 and the pen information signal PINFO may include a plurality of pulses. The pen information signal PINFO may have a pulse section in which at least one of the phase, duty ratio, and amplitude of the pen information signal PINFO may be varied. The second circuit TCR can recognize the pen information regarding the active pen 20, based on at least one of the phase, duty ratio, and amplitude of the pen information signal PINFO.

As set forth above, it may be possible to more variously diversify pulse states of a pen information signal PINFO by varying at least one of the phase, duty ratio, and amplitude of the pen information signal PINFO, thereby further increasing the amount of pen information that the pen information signal PINFO can carry within a predetermined limited time.

According to the example embodiments as described above, the touch display device 10, the active pen 20, the touch system, the touch circuit 300, and the pen recognition method may allow a variety of and a greater amount of pen information to be rapidly transmitted within a limited time. According to the example embodiments, the touch display device 10, the active pen 20, the touch system, the touch circuit 300, and the pen recognition method may allow a variety of and a greater amount of pen information to be accurately expressed in a shorter length. According to the example embodiments, the touch display device 10, the active pen 20, the touch system, the touch circuit 300, and the pen recognition method can further increase the amount of pen information that a pen information signal can carry within a predetermined limited time, so a greater amount of pen information regarding the active pen 20 can be more rapidly and accurately recognized.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A touch display device, comprising:
a panel comprising a plurality of touch electrodes; and
a touch circuit configured to:
    transfer a panel driving signal to the panel; and receive a pen information signal, output from a pen in response to the panel driving signal, through the panel, each of the panel driving signal and the pen information signal comprising a plurality of pulses, the pen information signal comprising one or more state sections among:
  an in-phase state section comprising pulses in phase with the pulses of the panel driving signal;
  an antiphase state section comprising pulses having a different phase from the pulses of the panel driving signal; and
  a passive state section distinguished from the in-phase state section and the antiphase state section,
wherein, while the touch display device transmits a beacon signal to the pen at least once through at least one touch electrode in the panel, the touch circuit does not transfer the panel driving signal to the panel,
wherein the touch display device does not transmit the beacon signal to the pen through the at least one touch electrode in the panel while the touch circuit transfers the panel driving signal to the panel, and
wherein the beacon signal includes at least one piece of information selected from among: a panel information, a panel driving mode information, a pen output signal characteristics information, a touch driving information, a multiplexer driving information, a power mode information, and a driving synchronization information,
wherein a single frame includes:
  a beacon transmission period in which the beacon signal is transmitted,
  a finger touch sensing period in which the touch circuit applies a touch driving signal for finger touch sensing to at least one touch electrode, and
  at least two display periods, in at least one of which display driving is performed,
wherein the touch driving signal includes a high level signal section and a low level signal section that are periodically repeated,
wherein the beacon signal includes a high level signal section and a low level signal section that are aperiodically repeated, and
wherein the beacon transmission period is between two adjacent display periods.

2. The touch display device of claim 1, wherein the passive state section is one section among: a ground voltage section, a DC voltage section, a floating state section, and a pulse section comprising pulses distinguishable from the pulses in the in-phase state section and the antiphase state section.

3. The touch display device of claim 1, wherein:
the in-phase state section indicates a first symbol value;
the antiphase state section indicates a second symbol value;
the passive state section indicates a third symbol value;
the first, second, and third symbol values are different from each other;
the pen information signal comprises N number of signal sections, where N≥1, selected from among three types of state sections, at least one type among the three types being repeatedly selectable, the three types of state sections including:
  the in-phase state section;
  the antiphase state section; and
  the passive state section;
the pen information signal indicates an N-digit symbol string including N number of symbol values selected from among three types of symbol values, at least one among the three types being repeatedly selectable, the three types of symbol values including:
  the first symbol value;
  the second symbol value; and
  the third symbol value; and
the N-digit symbol string corresponds to pen information regarding the pen.

4. The touch display device of claim 1, wherein each of the pulses in the pen information signal has a predetermined duty ratio.

5. The touch display device of claim 1, wherein each of the pulses in the pen information signal has a variable duty ratio.

6. The touch display device of claim 1, wherein:
the in-phase state section comprises one or more duty ratio control in-phase state sections among A number of duty ratio control in-phase state sections having different duty ratios, where A≥2; or
the antiphase state section comprises one or more duty ratio control antiphase state sections among B number of duty ratio control antiphase state sections having different duty ratios, where B≥2.

7. The touch display device of claim 6, wherein:
the A number of duty ratio control in-phase state sections;
the B number of duty ratio control antiphase state sections;
the passive state section indicates different symbol values;
the pen information signal comprises N number of signal sections selected from among (A+B+1) number of state sections, at least one of which being repeatedly selectable, the (A+B+1) number of state sections including:
  the A number of duty ratio control in-phase state sections;
  the B number of duty ratio control antiphase state sections; and
  the passive state section;
the pen information signal indicates an N-digit symbol string including N number of symbol values selected from among (A+B+1) number of symbol values, at least one of which being repeatedly selectable, the (A+B+1) number of symbol values corresponding to:
  the A number of duty ratio control in-phase state sections;
  the B number of duty ratio control antiphase state sections; and
  the passive state section; and
the N-digit symbol string corresponds to pen information regarding the pen.

8. The touch display device of claim 1, wherein each of the pulses in the pen information signal has a predetermined amplitude.

9. The touch display device of claim 1, wherein each of the pulses in the pen information signal has a variable amplitude.

10. The touch display device of claim 1, wherein:
the in-phase state section comprises one or more amplitude control in-phase state sections among C number of amplitude control in-phase state sections having different amplitudes, where C≥2; or
the antiphase state section comprises one or more amplitude control antiphase state sections among D number of amplitude control antiphase state sections having different amplitudes, where D≥2.

11. The touch display device of claim 10, wherein:
the C number of amplitude control in-phase state sections;
the D number of amplitude control antiphase state sections;
the passive state section indicates different symbol values;
the pen information signal comprises N number of signal sections selected from among (C+D+1) number of state sections, at least one of which being repeatedly selectable, the (C+D+1) number of state sections including:
the C number of amplitude control in-phase state sections;
the D number of amplitude control antiphase state sections; and
the passive state section;
the pen information signal indicates an N-digit symbol string comprising N number of symbol values selected from among (C+D+1) number of symbol values, at least one of which being repeatedly selectable, the (C+D+1) number of symbol values corresponding to:
the C number of amplitude control in-phase state sections;
the D number of amplitude control antiphase state sections; and
the passive state section; and
the N-digit symbol string corresponds to pen information regarding the pen.

12. The touch display device of claim 1, wherein each of the pulses in the pen information signal has a variable duty ratio and a variable amplitude.

13. The touch display device of claim 1, wherein the touch circuit is further configured to transfer a beacon signal to the pen through the panel before transferring the panel driving signal to the panel.

14. A touch system, comprising:
a pen configured to contact or be adjacent to a panel; and
a touch circuit configured to:
transfer a panel driving signal to the panel; and
receive a pen information signal, output from the pen in response to the panel driving signal, through the panel, each of the panel driving signal and the pen information signal comprising a plurality of pulses, the pen information signal comprising one or more state sections among:
an in-phase state section comprising pulses in phase with the pulses of the panel driving signal;
an antiphase state section comprising pulses having a different phase from the pulses of the panel driving signal; and
a passive state section distinguished from the in-phase state section and the antiphase state section,
wherein, while the touch display device transmits a beacon signal to the pen at least once through at least one touch electrode in the panel, the touch circuit does not transfer the panel driving signal to the panel,
wherein the touch display device does not transmit the beacon signal to the pen through the at least one touch electrode in the panel while the touch circuit transfers the panel driving signal to the panel, and
wherein the beacon signal includes at least one piece of information selected from among: a panel information, a panel driving mode information, a pen output signal characteristics information, a touch driving information, a multiplexer driving information, a power mode information, and a driving synchronization information,
wherein a single frame includes:
a beacon transmission period in which the beacon signal is transmitted,
a finger touch sensing period in which the touch circuit applies a touch driving signal for finger touch sensing to at least one touch electrode, and
at least two display periods, in at least one of which display driving is performed,
wherein the touch driving signal includes a high level signal section and a low level signal section that are periodically repeated,
wherein the beacon signal includes a high level signal section and a low level signal section that are aperiodically repeated, and
wherein the beacon transmission period is between two adjacent display periods.

15. A pen recognition method, comprising:
transferring a panel driving signal to a panel;
receiving a pen information signal, output from a pen in contact with or adjacent to the panel in response to the panel driving signal, through the panel, each of the panel driving signal and the pen information signal comprising a plurality of pulses, the pen information signal including one or more state sections among:
an in-phase state section comprising pulses in phase with the pulses of the panel driving signal;
an antiphase state section comprising pulses having a different phase from the pulses of the panel driving signal; and
a passive state section distinguished from the in-phase state section and the antiphase state section; and
recognizing pen information regarding the pen based on the pen information signal,
wherein, while the touch display device transmits a beacon signal to the pen at least once through at least one touch electrode in the panel, the touch circuit does not transfer the panel driving signal to the panel,
wherein the touch display device does not transmit the beacon signal to the pen through the at least one touch electrode in the panel while the touch circuit transfers the panel driving signal to the panel, and
wherein the beacon signal includes at least one piece of information selected from among: a panel information, a panel driving mode information, a pen output signal characteristics information, a touch driving information, a multiplexer driving information, a power mode information, and a driving synchronization information,
wherein a single frame includes:
a beacon transmission period in which the beacon signal is transmitted,
a finger touch sensing period in which the touch circuit applies a touch driving signal for finger touch sensing to at least one touch electrode, and
at least two display periods, in at least one of which display driving is performed,
wherein the touch driving signal includes a high level signal section and a low level signal section that are periodically repeated,
wherein the beacon signal includes a high level signal section and a low level signal section that are aperiodically repeated, and wherein the beacon transmission period is between two adjacent display periods.

16. A pen working in concert with a touch display device, comprising:
at least one pen tip configured to be brought into contact with or brought adjacently to a panel of the touch display device; and
a processor configured to:
receive a panel driving signal through the at least one pen tip; and
output a pen information signal through the at least one pen tip in response to the panel driving signal, each of the panel driving signal and the pen information signal comprising a plurality of pulses, the pen information signal including one or more state sections among an in-phase state section comprising pulses in phase with the pulses of the panel driving signal, an antiphase state section comprising pulses having a different phase from the pulses of the panel driving signal, and a passive state section distinguished from the in-phase state section and the antiphase state section,
wherein, while the pen receives a beacon signal through at least one touch electrode in the panel, a touch circuit of the touch display device does not transfer the panel driving signal to the panel,
wherein the pen does not receive the beacon signal through the at least one touch electrode in the panel while the touch circuit transfers the panel driving signal to the panel, and
wherein the beacon signal includes at least one piece of information selected from among: a panel information, a panel driving mode information, a pen output signal characteristics information, a touch driving information, a multiplexer driving information, a power mode information, and a driving synchronization information,
wherein a single frame includes:
a beacon transmission period in which the beacon signal is transmitted,
a finger touch sensing period in which the touch circuit applies a touch driving signal for finger touch sensing to at least one touch electrode, and
at least two display periods, in at least one of which display driving is performed,
wherein the touch driving signal includes a high level signal section and a low level signal section that are periodically repeated,
wherein the beacon signal includes a high level signal section and a low level signal section that are aperiodically repeated, and
wherein the beacon transmission period is between two adjacent display periods.

17. The pen of claim 16, wherein the passive state section is one section among: a ground voltage section, a DC voltage section, a floating state section, and a pulse section comprising pulses distinguishable from the pulses in the in-phase state section and the antiphase state section.

18. The pen of claim 16, wherein:
the in-phase state section indicates a first symbol value;
the antiphase state section indicates a second symbol value;
the passive state section indicates a third symbol value;
the first, second, and third symbol values are different from each other;
the pen information signal comprises N number of signal sections, where N≥1, selected from among three types of state sections, at least one type of which is repeatedly selectable, the three types of state sections including the in-phase state section, the antiphase state section, and the passive state section;
the pen information signal indicates a symbol value string, including N number of symbol values selected from among three types of symbol values, at least one of which is repeatedly selectable, the three types of symbol values including the first symbol value, the second symbol value, and the third symbol value; and
the symbol value string corresponds to pen information regarding the pen.

19. The pen of claim 16, wherein each of the pulses in the pen information signal has a variable duty ratio.

20. The pen of claim 16, wherein each of the pulses in the pen information signal has a variable amplitude.

21. A touch circuit, comprising:
a first circuit configured to:
output a panel driving signal to a panel, receiving a pen information signal, output from a pen in response to the panel driving signal, through the panel, each of the panel driving signal and the pen information signal comprising a plurality of pulses, the pen information signal including one or more state sections among:
an in-phase state section comprising pulses in phase with the pulses of the panel driving signal;
an antiphase state section comprising pulses having a different phase from the pulses of the panel driving signal; and
a passive state section distinguished from the in-phase state section and the antiphase state section; and
output a digital value corresponding to the pen information signal,
wherein, while the touch circuit provides a beacon signal to the pen at least once through at least one touch electrode in the panel, the panel driving signal is not output to the panel,
wherein the touch circuit does not provide the beacon signal to the pen through the at least one touch electrode in the panel while the panel driving signal is output to the panel, and
wherein the beacon signal includes at least one piece of information selected from among: a panel information, a panel driving mode information, a pen output signal characteristics information, a touch driving information, a multiplexer driving information, a power mode information, and a driving synchronization information,
wherein a single frame includes:
a beacon transmission period in which the beacon signal is transmitted,
a finger touch sensing period in which the touch circuit applies a touch driving signal for finger touch sensing to at least one touch electrode, and
at least two display periods, in at least one of which display driving is performed,
wherein the touch driving signal includes a high level signal section and a low level signal section that are periodically repeated,
wherein the beacon signal includes a high level signal section and a low level signal section that are aperiodically repeated, and
wherein the beacon transmission period is between two adjacent display periods.

22. A touch display device, comprising:
a panel comprising a plurality of touch electrodes; and
a touch circuit configured to:
- transfer a panel driving signal to the panel; and
- receive a pen information signal, output from a pen in response to the panel driving signal, through the panel, each of the panel driving signal and the pen information signal comprising a plurality of pulses, the pen information signal comprising a pulse section, in which at least one of a phase, a duty ratio, and an amplitude is varied,
wherein, while the touch display device transmits a beacon signal to the pen at least once through at least one touch electrode in the panel, the touch circuit does not transfer the panel driving signal to the panel,
wherein the touch display device does not transmit the beacon signal to the pen through the at least one touch electrode in the panel while the touch circuit transfers the panel driving signal to the panel, and
wherein the beacon signal includes at least one piece of information selected from among: a panel information, a panel driving mode information, a pen output signal characteristics information, a touch driving information, a multiplexer driving information, a power mode information, and a driving synchronization information,
wherein a single frame includes:
- a beacon transmission period in which the beacon signal is transmitted,
- a finger touch sensing period in which the touch circuit applies a touch driving signal for finger touch sensing to at least one touch electrode, and
- at least two display periods, in at least one of which display driving is performed,
wherein the touch driving signal includes a high level signal section and a low level signal section that are periodically repeated,
wherein the beacon signal includes a high level signal section and a low level signal section that are aperiodically repeated, and
wherein the beacon transmission period is between two adjacent display periods.

23. A pen working in concert with a touch display device, comprising:
at least one pen tip configured to contact or be adjacent to a panel of the touch display device; and
a processor configured to:
- receive a panel driving signal through the at least one pen tip; and
- output a pen information signal through the at least one pen tip in response to the panel driving signal, each of the panel driving signal and the pen information signal comprising a plurality of pulses, the pen information signal comprising a pulse section, in which at least one of a phase, a duty ratio, and an amplitude is varied,
wherein, while the pen receives a beacon signal through at least one touch electrode in the panel, a touch circuit of the touch display device does not transfer the panel driving signal to the panel,
wherein the pen does not receive the beacon signal through the at least one touch electrode in the panel while the touch circuit transfers the panel driving signal to the panel, and
wherein the beacon signal includes at least one piece of information selected from among: a panel information, a panel driving mode information, a pen output signal characteristics information, a touch driving information, a multiplexer driving information, a power mode information, and a driving synchronization information,
wherein a single frame includes:
- a beacon transmission period in which the beacon signal is transmitted,
- a finger touch sensing period in which the touch circuit applies a touch driving signal for finger touch sensing to at least one touch electrode, and
- at least two display periods, in at least one of which display driving is performed,
wherein the touch driving signal includes a high level signal section and a low level signal section that are periodically repeated,
wherein the beacon signal includes a high level signal section and a low level signal section that are aperiodically repeated, and
wherein the beacon transmission period is between two adjacent display periods.

24. A touch circuit, comprising:
a first circuit configured to:
- output a panel driving signal to a panel;
- receive a pen signal, output from a pen in response to the panel driving signal, through the panel, the pen signal comprising a pulse section, in which at least one of a phase, a duty ratio, and an amplitude is varied, each of the panel driving signal and the pen signal comprising a plurality of pulses; and
- output a digital value corresponding to the pen signal; and
a second circuit configured to receive the digital value,
wherein, while the touch circuit provides a beacon signal to the pen at least once through at least one touch electrode in the panel, the panel driving signal is not output to the panel,
wherein the touch circuit does not provide the beacon signal to the pen through the at least one touch electrode in the panel while the panel driving signal is output to the panel, and
wherein the beacon signal includes at least one piece of information selected from among: a panel information, a panel driving mode information, a pen output signal characteristics information, a touch driving information, a multiplexer driving information, a power mode information, and a driving synchronization information,
wherein a single frame includes:
- a beacon transmission period in which the beacon signal is transmitted,
- a finger touch sensing period in which the touch circuit applies a touch driving signal for finger touch sensing to at least one touch electrode, and
- at least two display periods, in at least one of which display driving is performed,
wherein the touch driving signal includes a high level signal section and a low level signal section that are periodically repeated,
wherein the beacon signal includes a high level signal section and a low level signal section that are aperiodically repeated, and
wherein the beacon transmission period is between two adjacent display periods.

* * * * *